Sept. 11, 1956      J. O. BURMAN      2,762,275
BOX AND PAD COVERING MACHINE
Filed Nov. 26, 1952      14 Sheets-Sheet 2
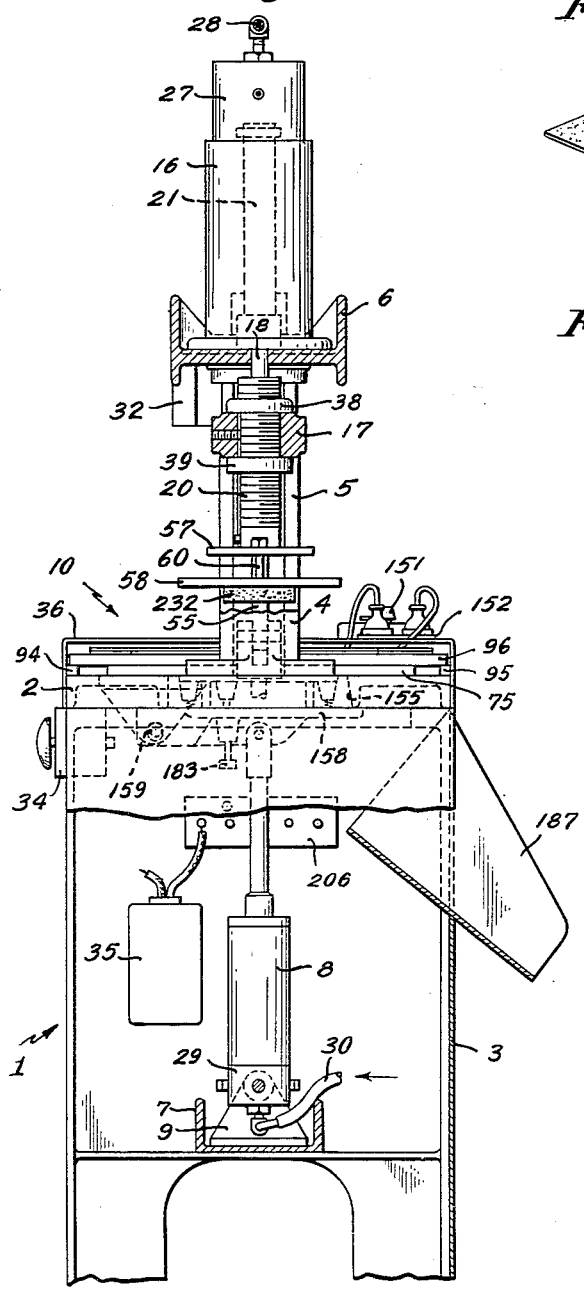
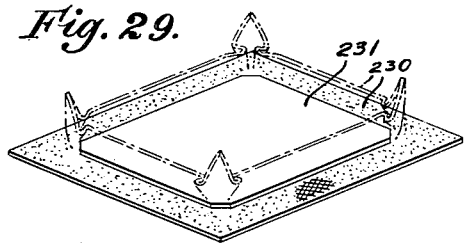
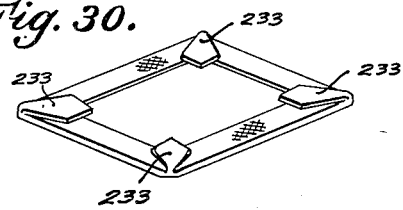
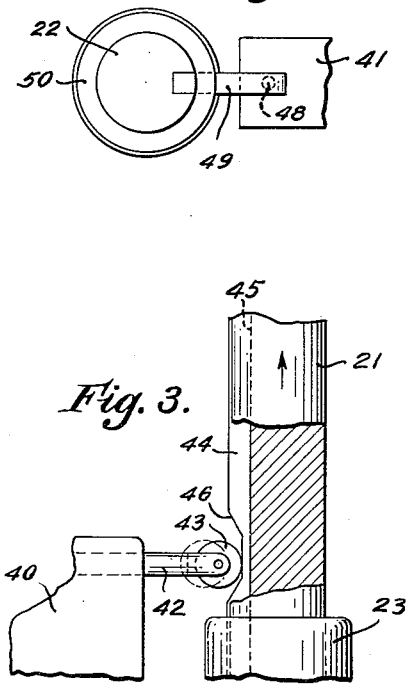
Inventor,
Joseph O. Burman,
by Townsend M Gunn
Atty.

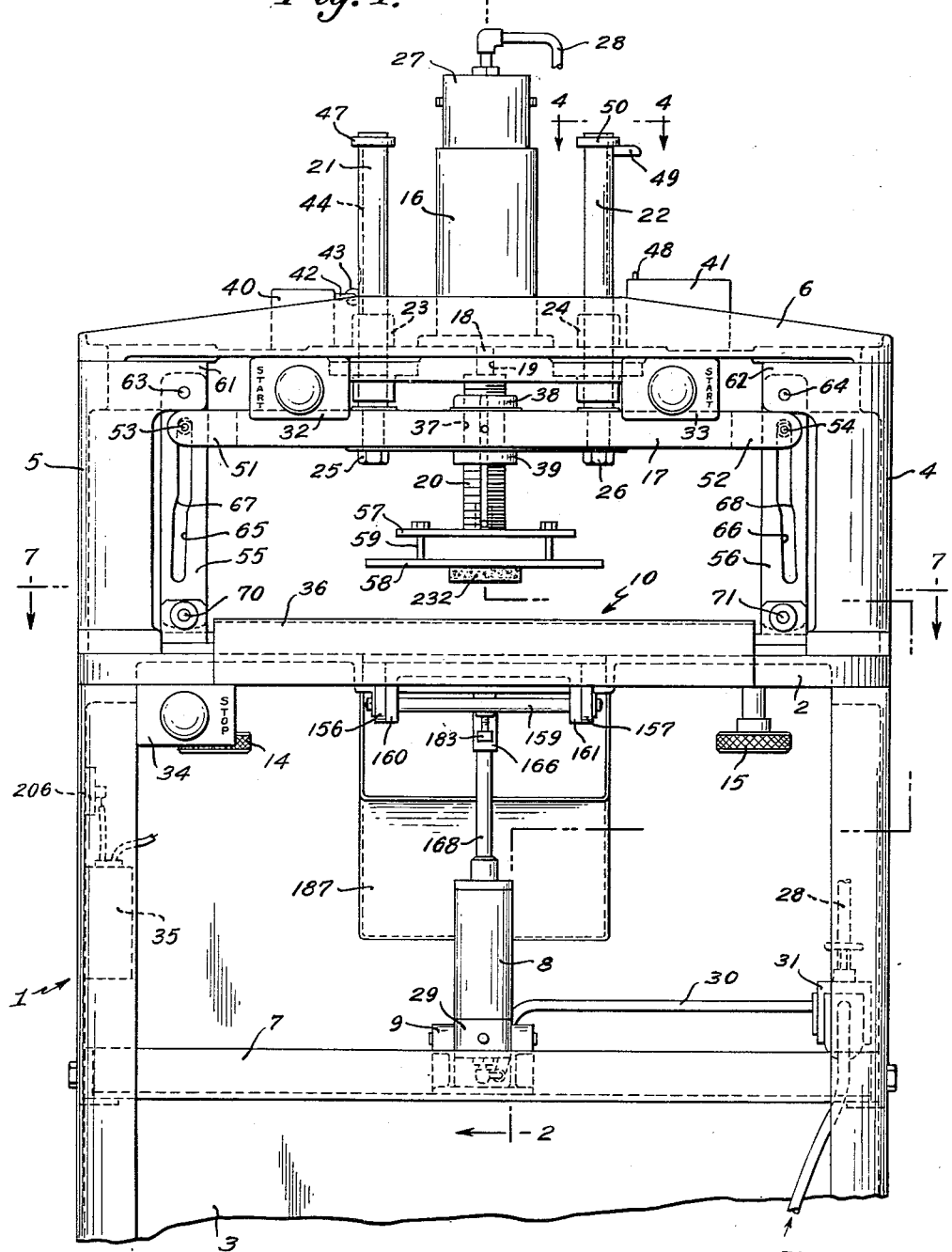

Sept. 11, 1956  J. O. BURMAN  2,762,275
BOX AND PAD COVERING MACHINE
Filed Nov. 26, 1952  14 Sheets-Sheet 3

Inventor,
Joseph O. Burman,
by Townsend M. Gunn,
Atty.

Sept. 11, 1956 J. O. BURMAN 2,762,275
BOX AND PAD COVERING MACHINE
Filed Nov. 26, 1952 14 Sheets-Sheet 4
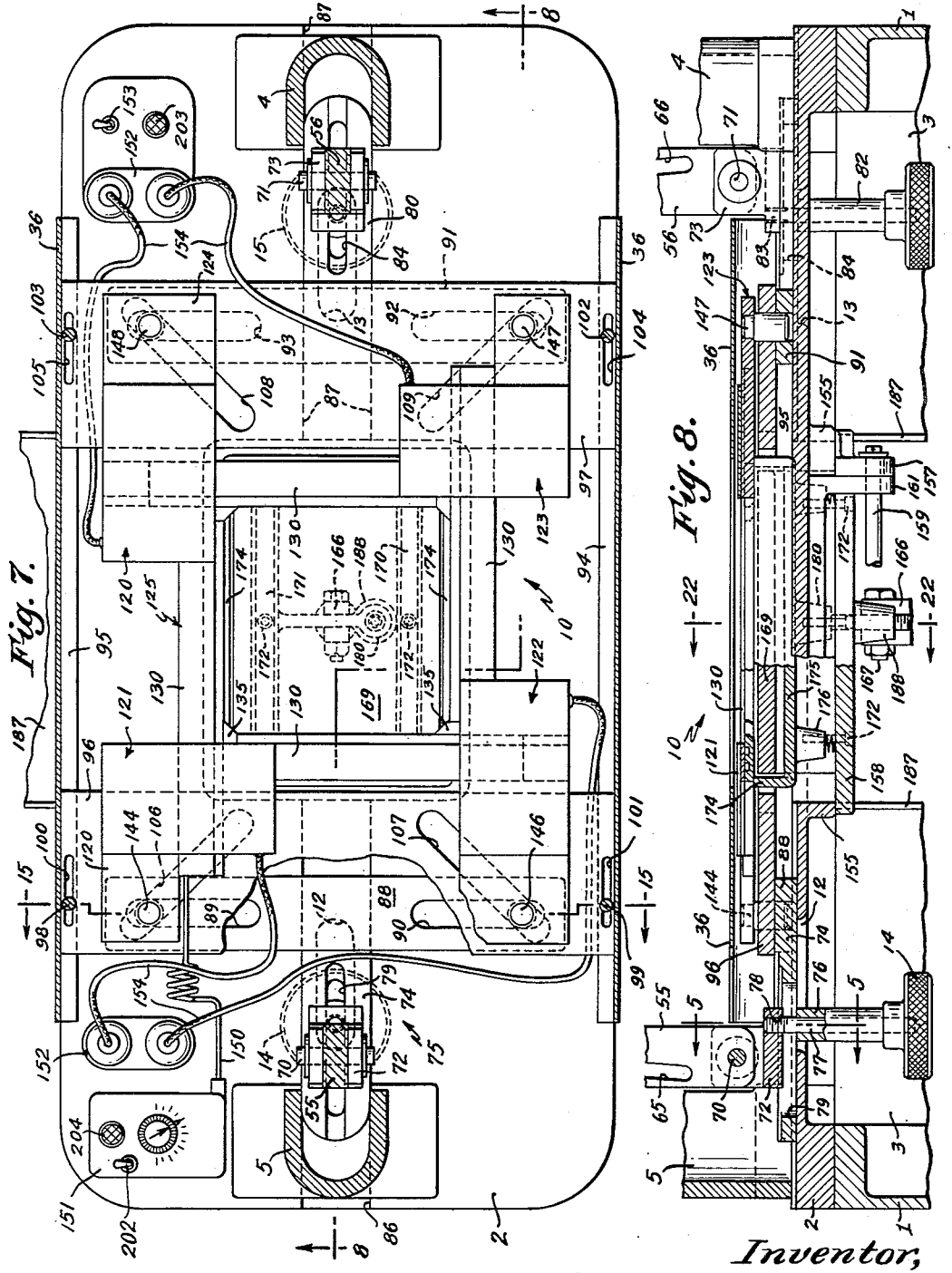
Inventor,
Joseph O. Burman,
by Townsend M. Gunn
Atty.

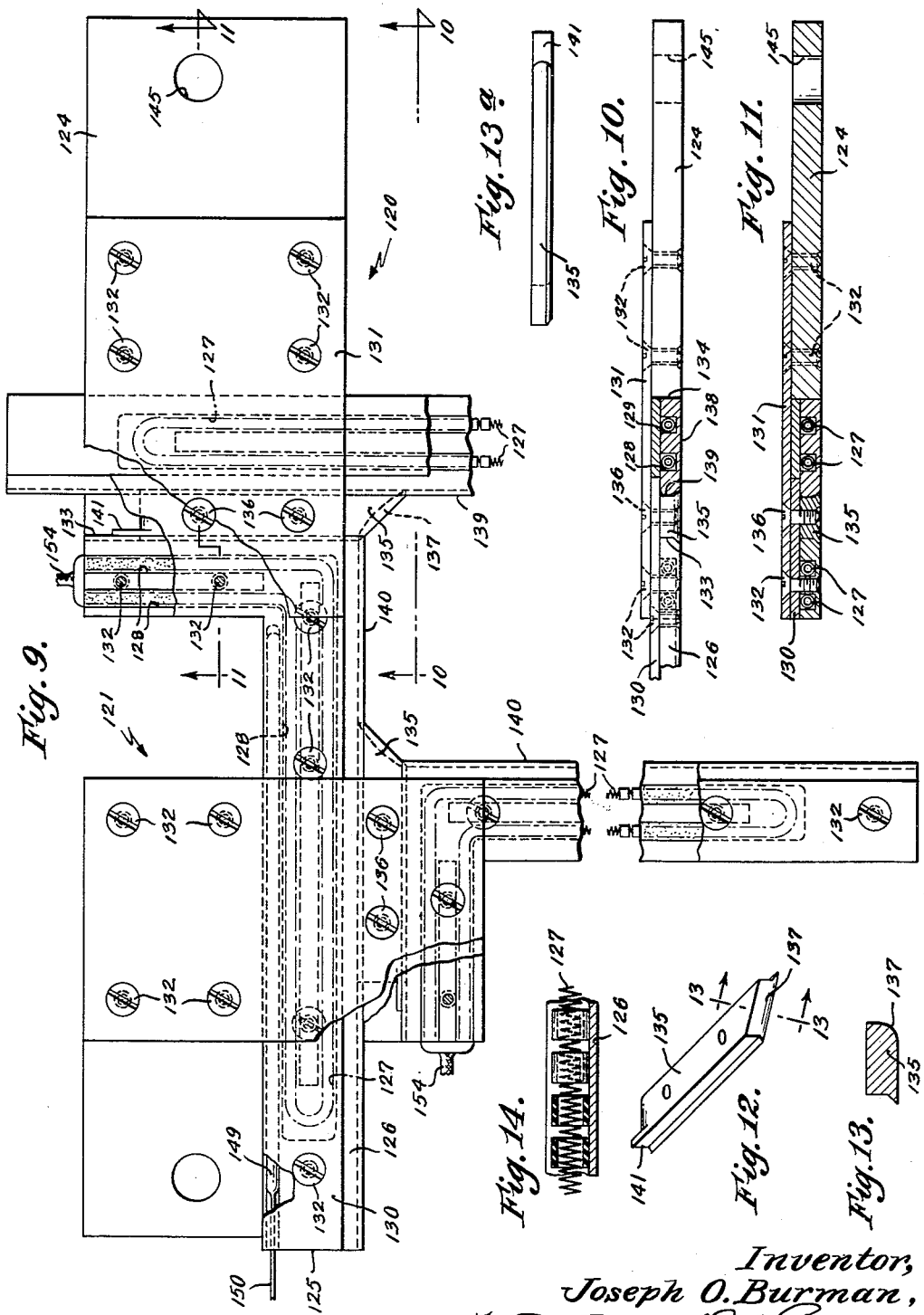

Sept. 11, 1956     J. O. BURMAN     2,762,275
BOX AND PAD COVERING MACHINE
Filed Nov. 26, 1952                   14 Sheets-Sheet 6

Inventor,
Joseph O. Burman,
by Townsend M. Gunn
Atty.

Sept. 11, 1956     J. O. BURMAN     2,762,275
BOX AND PAD COVERING MACHINE
Filed Nov. 26, 1952     14 Sheets-Sheet 7

Inventor,
Joseph O. Burman,
by Townsend M. Gunn
Atty.

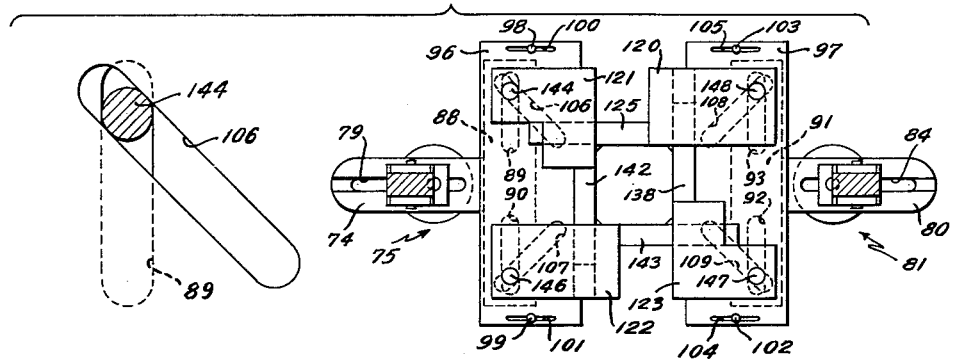
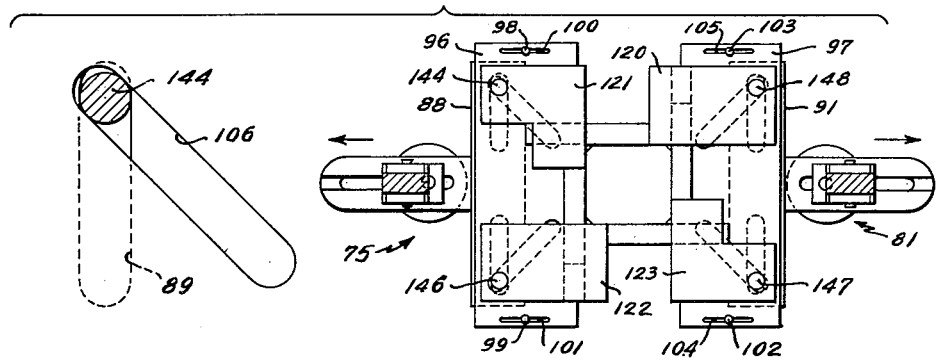
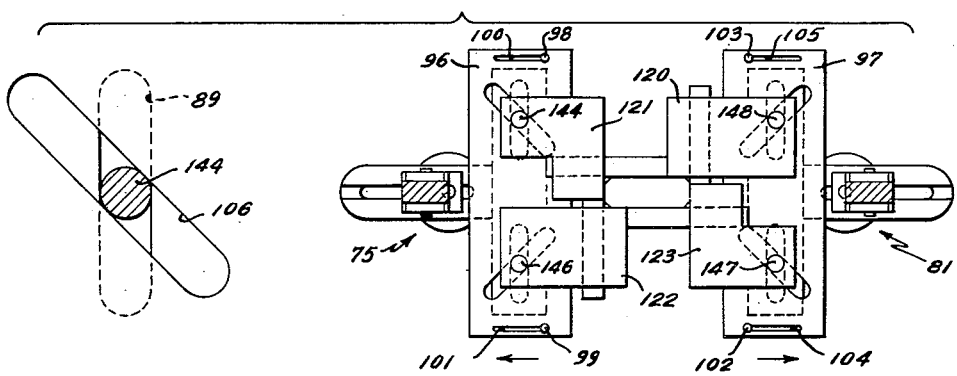

Sept. 11, 1956  J. O. BURMAN  2,762,275
BOX AND PAD COVERING MACHINE
Filed Nov. 26, 1952  14 Sheets—Sheet 9

Inventor,
Joseph O. Burman,
by Townsend M Gunn
Atty.

Inventor,
Joseph O. Burman,
by Townsend M Gunn Att'y.

Sept. 11, 1956     J. O. BURMAN     2,762,275
BOX AND PAD COVERING MACHINE
Filed Nov. 26, 1952     14 Sheets-Sheet 11
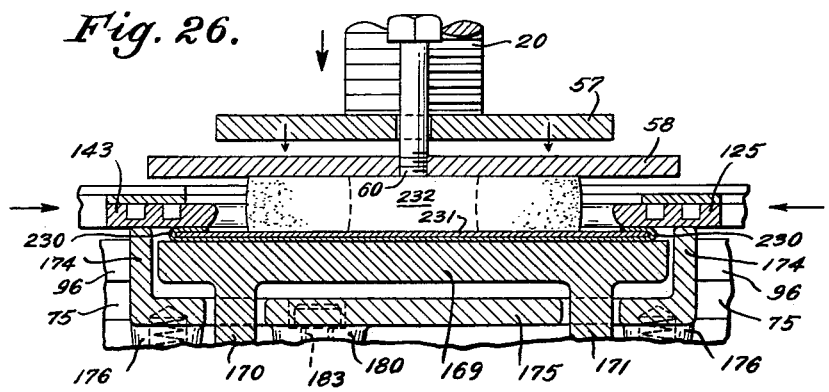
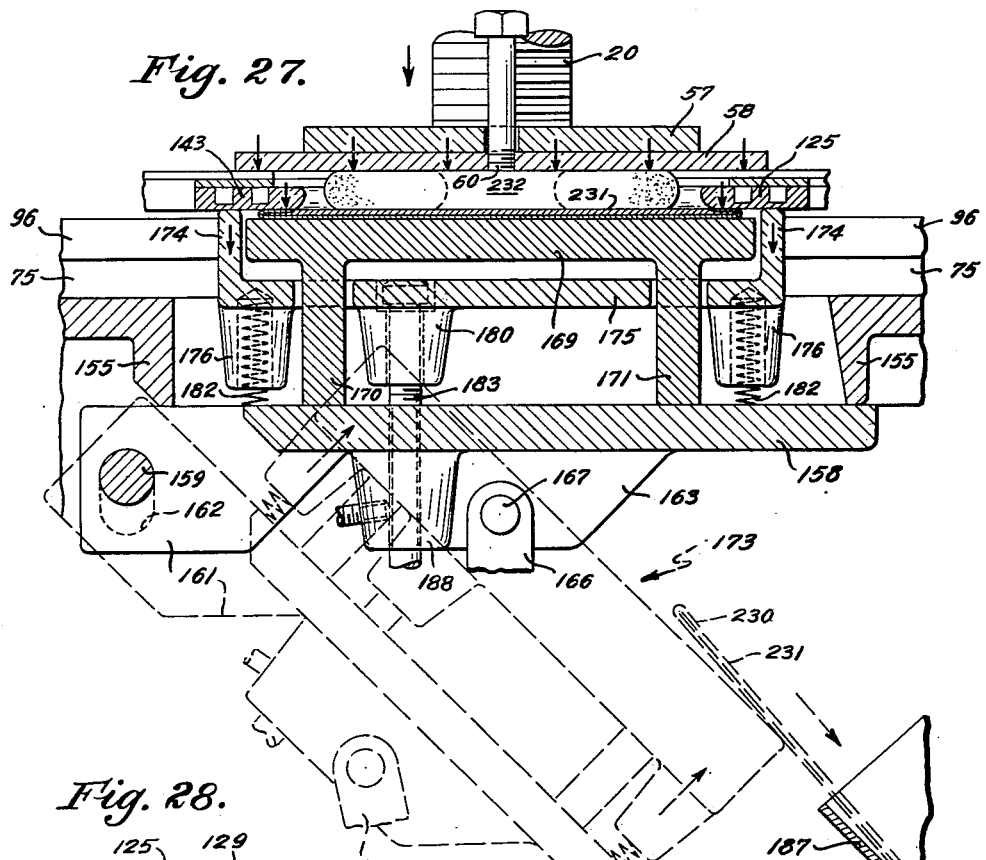
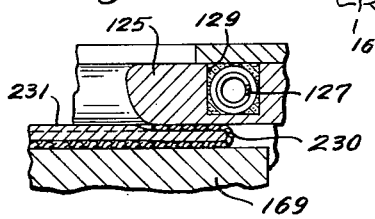
Inventor,
Joseph O. Burman,
by Townsend M. Gunn,
Atty.

Sept. 11, 1956  J. O. BURMAN  2,762,275
BOX AND PAD COVERING MACHINE
Filed Nov. 26, 1952  14 Sheets-Sheet 12

Inventor,
Joseph O. Burman,
by Townsend M. Gunn,
Atty.

Sept. 11, 1956    J. O. BURMAN    2,762,275
BOX AND PAD COVERING MACHINE
Filed Nov. 26, 1952    14 Sheets—Sheet 13

Inventor,
Joseph O. Burman,
by Townsend M Gunn,
Atty.

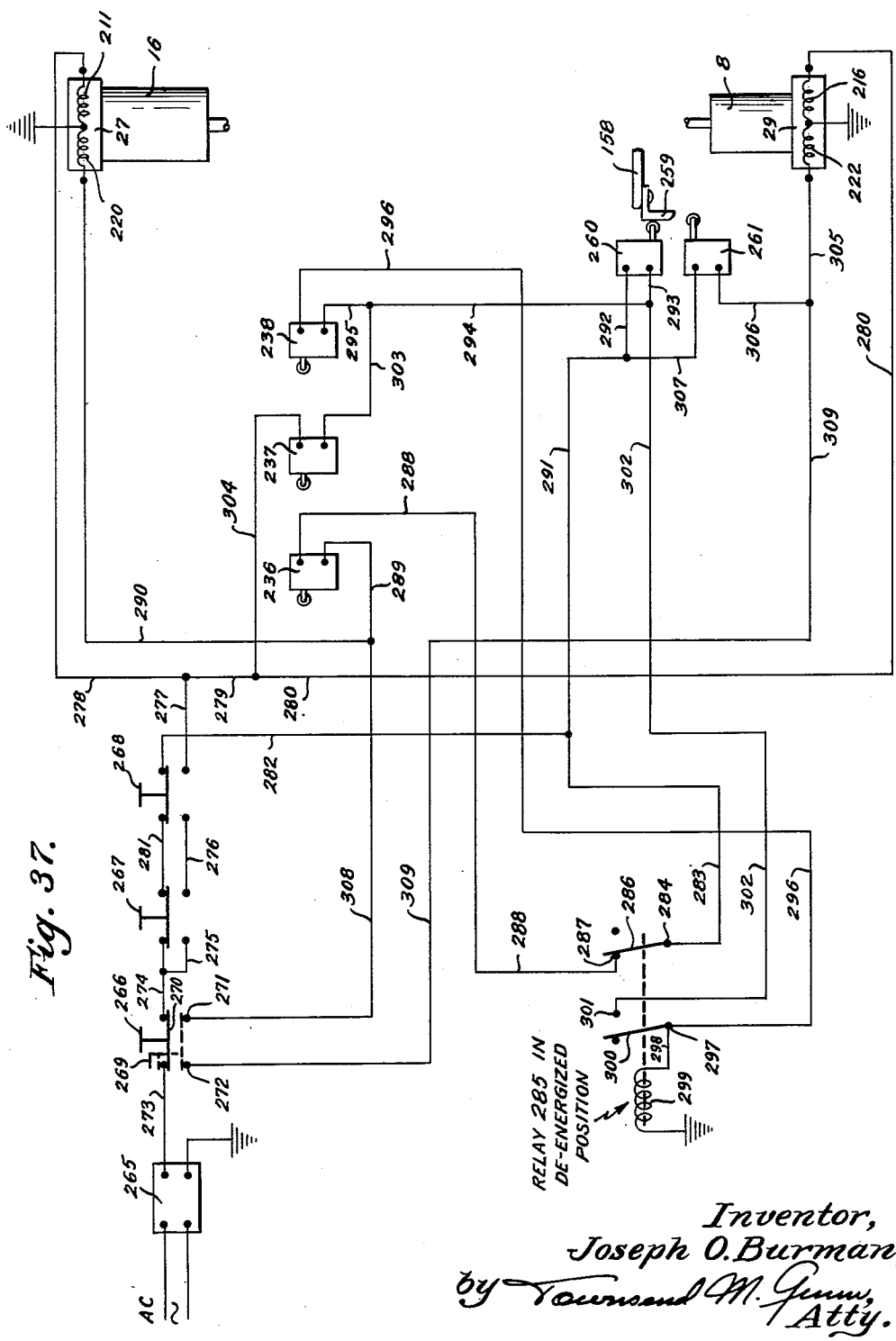

United States Patent Office 2,762,275
Patented Sept. 11, 1956

2,762,275

BOX AND PAD COVERING MACHINE

Joseph O. Burman, Norton, Mass.

Application November 26, 1952, Serial No. 322,719

19 Claims. (Cl. 93—54.2)

This invention relates to machines for covering forms with a covering material. It particularly relates to machines which work semi-automatically and which are of such basic nature that they may be adapted, with some changes, to cover either boxes or pads such as are used in the jewelry industry.

In the box making and covering business, much of the work is still done by hand. One of the reasons for this is that machines for covering boxes automatically are relatively expensive and are generally made for a given size box. In the jewelry field today, the changing styles require frequent change in box size and shape, and it therefore becomes prohibitively expensive for small box makers to buy the necessary machinery. The same situation exists in the pad making business, a pad being a term used to describe the flat or curved insert which is placed in the bottom and top of a jewelry display box to cover the bottom inside, and also to serve as a mounting for the jewelry article. Pads come in many sizes and shapes, and for this reason, pad covering is still done today, in many places, by hand.

There is a great need, therefore, for a relatively simple semi-automatic machine which is capable, by making a few minor adjustments, of covering several sizes and shapes of boxes. It is also greatly to be desired, for economy, that this same machine be adapted by the manufacturer thereof to be changed to a machine for covering pads in several sizes and shapes without too great an expense, therefore providing a relatively economical machine for covering either boxes or pads.

As indicated above, presently existing box covering machines are relatively expensive. They are also relatively complicated, and intricate to adjust. The machines of this invention, on the contrary, are relatively inexpensive (due to the aforementioned adaptability of the basic machine to be converted into either a box or pad machine), and are simple to adjust. In prior art machines, the unloading is done in the same work space as loading is done. In the machines of my invention, loading is in one area, and unloading is in another, thus leaving a readily accessible loading area at all times and increasing the speed of using the machines. In prior art machines, the heating of the box or pad to set the glue, is done after the covering has been put on, the work piece generally remaining stationary during this time. In my invention, the heating is done while the several components of the machine are going through their respective motions, and thus valuable heating time is saved. This speeds the operating rate of the machines.

In my machine, simple adjustments enable the covering of all sizes of pads or boxes of square or rectangular shape with no, or at most a minimum of, special tooling.

In my invention, the conversion of the machine from box covering to pad covering, or vice versa, is essentially done by simply turning two cam levers around to another position, and changing the electrical control system. I do not know of any prior art machine in which such conversion can be done so readily.

Among the various objects of the invention, therefore, may be noted the provision of a basic form-covering machine which is readily adjustable to cover most, if not all, sizes of jewelry display boxes with a minimum amount of special tooling; a machine of the class described which may be economically converted into a machine to cover various shapes of boxes; a machine of the class described which is adjustable to cover all sizes of square or rectangularly shaped pads without further tooling; a machine of the last-named class in which a fundamental change in the machine's operation is done by repositioning two cam-levers; a machine of the class described in which means are embodied to heat the form being covered during unavoidably present movements of components, therefore resulting in time saving in the operation of the machine; the provision of a machine of the class described in which the form is loaded at one place, and automatically ejected at another place; the provision of a machine of the class described in which certain elements act both as tuck-in fingers or wipers and as heated irons for pressing covering material; the provision of a machine of the class described in which the motivating power is fluid-actuated cylinders and plungers, working both together and in opposition to each other; and the provision of a machine of the class described which is economical to build and simple to adjust and operate. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which several of various possible embodiments of the invention are illustrated:

Fig. 1 is an elevation (front view) of one embodiment of the machine of this invention;

Fig. 2 is a cross sectional side view of the Fig. 1 embodiment, taken along sight lines 2—2 thereon;

Fig. 3 is an enlarged side view of a timing-shaft portion of the Fig. 1 embodiment, given partly in section;

Fig. 4 is a plan view of another timing-shaft portion of the Fig. 1 machine;

Fig. 7 is a top view of the table assembly of the Fig. 1 embodiment, taken in the direction of sight lines 7—7 on Fig. 1;

Fig. 8 is a cross-sectional view of the Fig. 7 construction, taken along sight lines 8—8 on Fig. 7;

Fig. 9 is a fragmentary plan view of the wipers of this invention;

Fig. 10 is a cross-section of the Fig. 9 construction, taken in the direction of sight lines 10—10 on Fig. 9;

Fig. 11 is a view similar to Fig. 10, but taken in the direction of sight lines 11—11 on Fig. 9;

Fig. 12 is a perspective view of a corner plate of the Fig. 9 wipers;

Fig. 13 is a cross-section elevation of the Fig. 12 corner plate, taken in the direction of sight lines 13—13 on Fig. 12;

Fig. 13A is a side view of the Fig. 12 corner plate.

Fig. 14 is a fragmentary longitudinal section of one of the heating element grooves in the Fig. 9 construction;

Figs. 19, 20 and 21 are schematic representations of the cam plate and wiper mechanism, given to illustrate certain steps of adjustment thereof;

Figure 24:
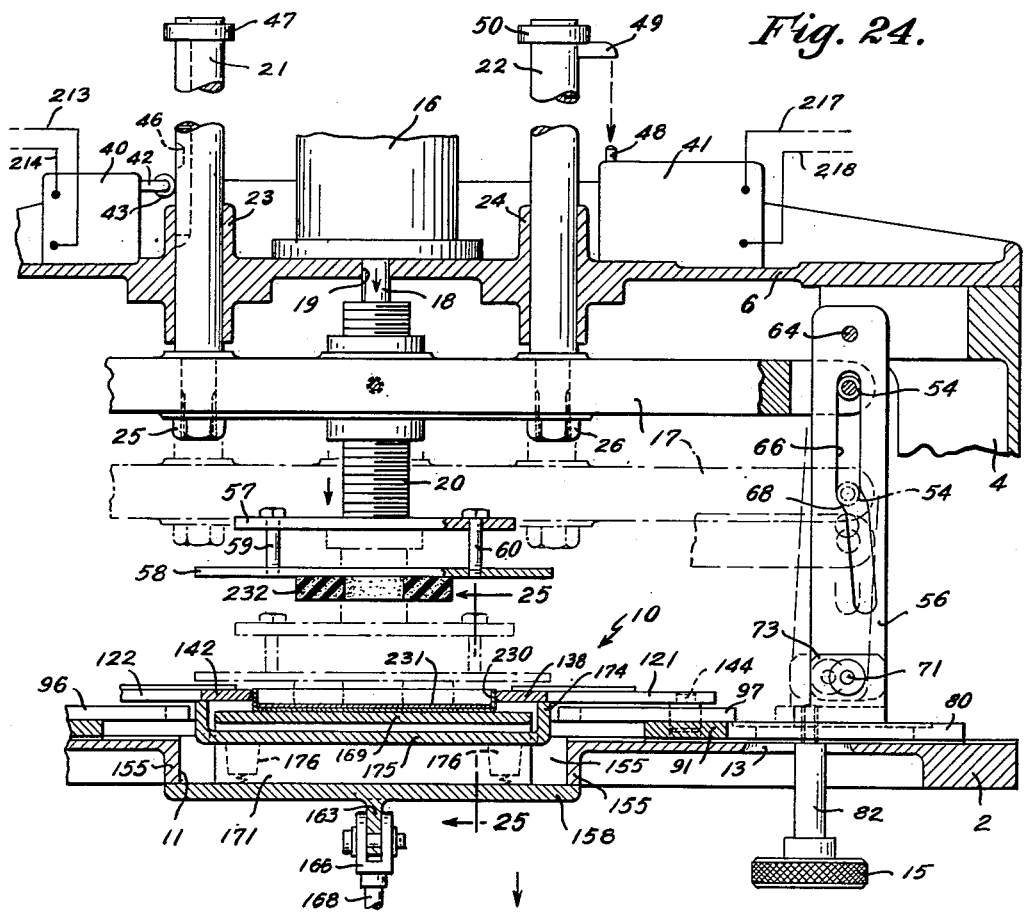
Figure 25:
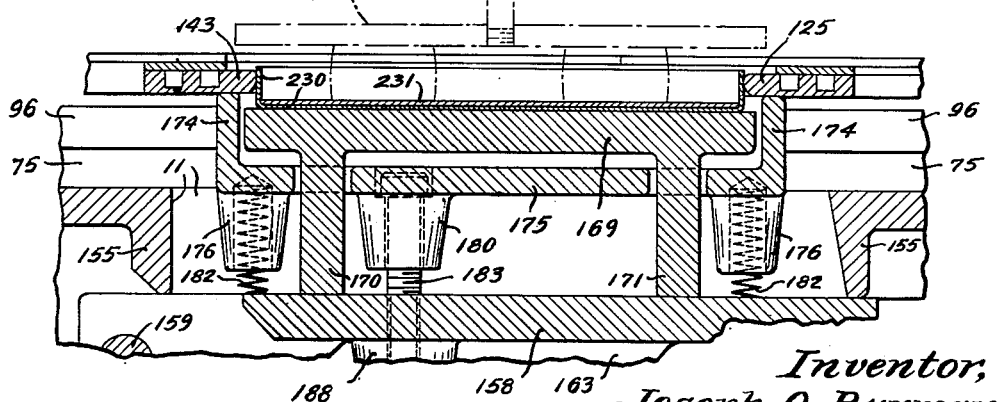
Figure 31:
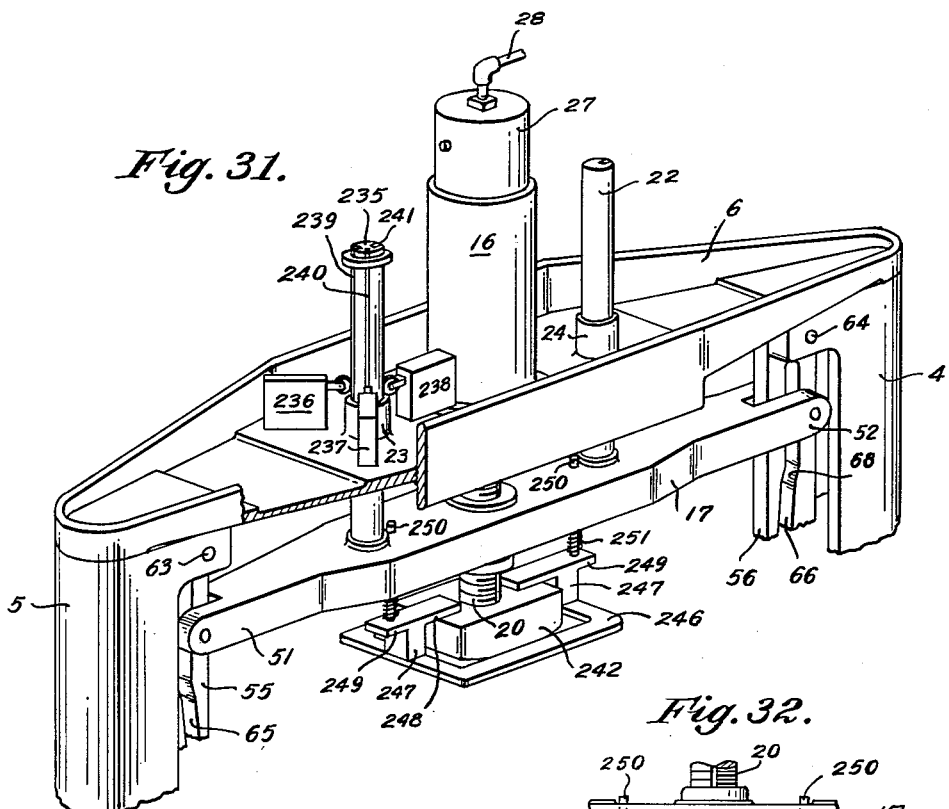
Figure 32:
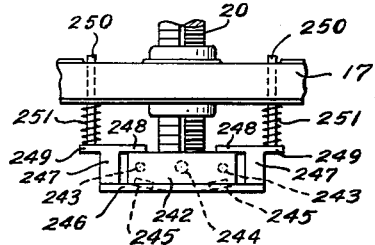
Figure 33:
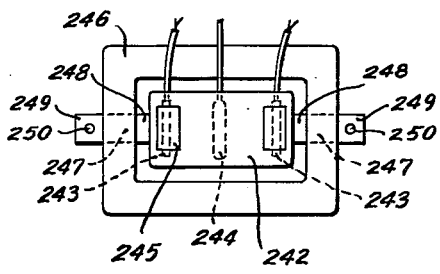
Figure 34:
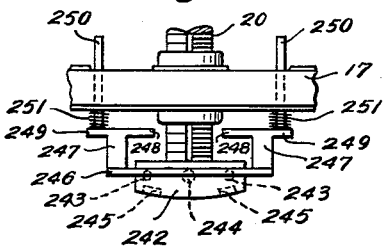
Figure 35:
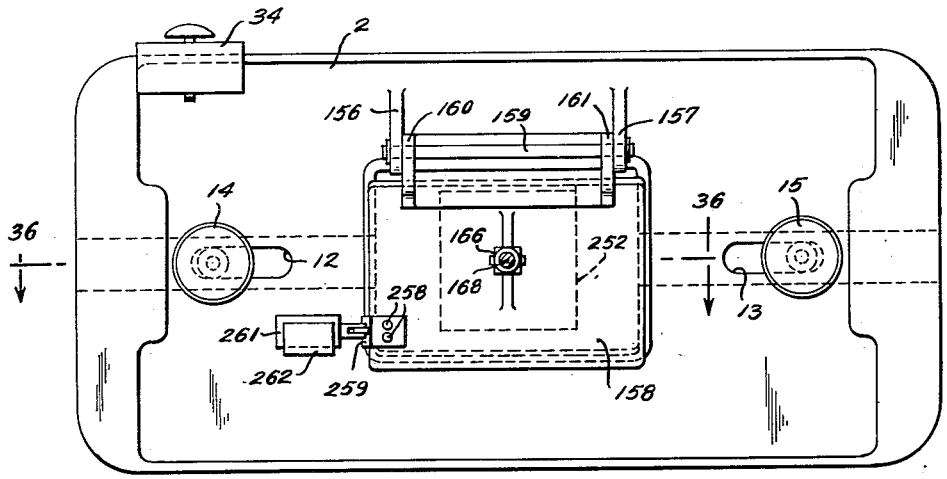
Figure 36:
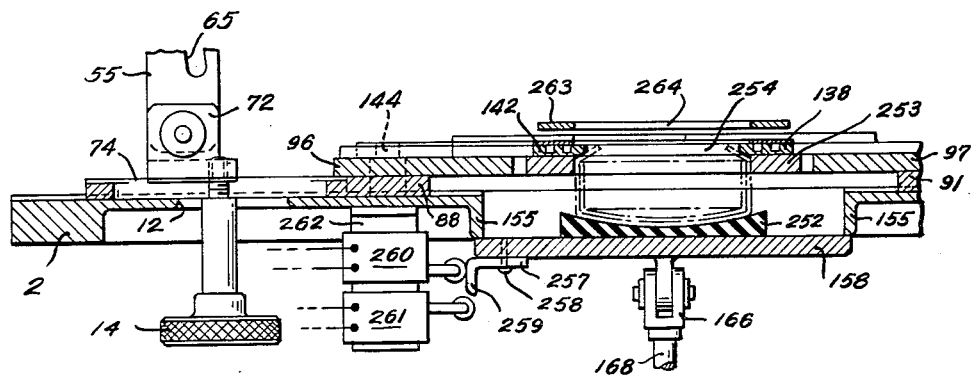

Figs. 24, 25, 26 and 27 are enlarged views of portions of the Fig. 1 embodiment, given to illustrate certain steps in the covering of a pad with covering material, Figs. 25, 26 and 27 being taken in the direction of sight lines 25 on Fig. 24;

Fig. 28 is an enlarged view of a portion of the Fig. 27 view, to show certain details more clearly;

Fig. 29 is a perspective view of a pad partially covered, the material being shown in dotted lines in partially folded position;

Fig. 30 shows the Fig. 29 article in its finished state;

Fig. 31 is a perspective view of a portion of the Fig. 1 embodiment, showing certain changes made therein to form a second embodiment of this invention;

Fig. 32 is a side view of a portion of the Fig. 31 embodiment;

Fig. 33 is a bottom view of the Fig. 32 construction;

Fig. 34 is a side view similar to Fig. 32, but showing the parts in a different operative position;

Fig. 35 is a view of the bottom of the table of the Fig. 31 embodiment, looking upwardly;

Fig. 36 is a front sectional view of a part of the Fig. 35 table; and

Fig. 37 is a schematic diagram of the wiring circuit for the Fig. 31 machine.

Similar reference characters indicate corresponding parts throughout the several views of the drawings.

The machines of this invention, in their preferred embodiments, basically comprise six assemblies of components, all of which coact in the operation of the machine in covering a box or a pad. This application will describe these assemblies separately, and will set forth the mechanical, hydraulic, and electrical inter-connections between them. The adjustment and operation of the machines for box and pad covering will be described partly as the assemblies are described and partly thereafter.

The six assemblies are as follows: (I) the stand and base of the machines; (II) the drive bar with its associated timing rods, air or hydraulic drive cylinders, and timing switches; (III) the drive cam levers with their adjustments; (IV) the wiper mechanism with its associated adjusting means; (V) the discharge platform with its air or hydraulic means; and (VI) the electrical circuits. These descriptions now follow, with the pad machine being described in detail, since with it the mechanics of the machine may be explained more readily.

*I. The stand or base*

Referring to the drawings, in Fig. 1 there is indicated generally by numeral 1 the stand or base comprising the table 2, supported by the legs 3 and in turn supporting, by columns 4 and 5, the top bar 6. Attached to the legs 3 at each end and lying parallel to the table 2 is the cross-bar 7 (shown as being made of angle iron), and on this cross bar is mounted a fluid actuated reciprocating means, in this case an air cylinder 8, by means of pivot 9.

Mounted on and carried by the table 2 is the wiper mechanism (described under IV below and shown in Figs. 6, 7, 9 and 15) which is here indicated generally by numeral 10. Table 2 is preferably made of a single piece of metal and extends across the length and width of the machine. Table 2 is provided with a generally central opening 11 through which covered pads are to be ejected. Table 2 is also provided with longitudinally extending slots 12 and 13 through which project the adjusting handles 14 and 15 respectively. Slots 12 and 13 are located approximately midway between the front and back edges of table 2.

Supported by columns 4 and 5 is the top-bar 6, which in this instance is channel-shaped for strength and rigidity. Mounted in the approximate center of bar 6 is a fluid-actuated reciprocating means 16, in this case an air cylinder, the purpose of which is to move drive bar 17 up and down toward table 2. The piston rod 18 of cylinder 16 slidably extends through a hole 19 in bar 6 and has its outer (movable) end firmly attached to ram 20 which in turn is adjustably fastened to drive bar 17.

It will be noted that air cylinder 16 is larger than cylinder 8, so that cylinder 16 exerts more force than cylinder 8. The purpose of this will be described in connection with the box machine.

Also slidably mounted on top-bar 6 are the timing shafts 21 and 22. These shafts are slidably fitted in bushings 23 and 24 which are in turn fixed in the bottom of top-bar 6. The bottom end of each of shafts 21 and 22 is attached to drive-bar 17, as shown, by conventional shoulder and threaded nut engagements 25 and 26. Thus as the piston rod 18 of air cylinder 16 moves drive-bar 17 up and down, the timing shafts 21 and 22 follow this motion up and down.

Cylinder 16 is provided on its top with an electromagnetic double-acting valve structure 27, the valve therein being of the kind that is actuated by impulse. That is, a momentary electrical impulse to one solenoid will admit air to drive the piston down. An impulse to the other solenoid will admit air to the other side of the piston to drive the piston up. Air is supplied to the cylinder by means of pipe 28. In similar fashion, cylinder 8 is provided with the double-acting electromagnetic valve 29. Air is supplied to the cylinder 8 by means of pipe 30. Again, an impulse to one solenoid in the valve 29 will admit air to drive the piston up, while an impulse to the other solenoid will admit air to the other side of the piston to drive the piston down. A lubricating unit and pressure regulating assembly 31 of conventional type is provided, as is customary, to oil the pistons of the cylinders and to adjust the air pressure.

Also mounted on top-bar 6 are the series connected start switches 32 and 33; and on the table 2 is mounted the stop switch 34. A cover 36 for certain operating parts is provided.

In this embodiment I prefer to use low voltage connections throughout, hence there is provided a transformer 35 to one side of which is connected the power line, and from the other side of which comes the low voltage with which the electrical circuit is powered.

*II. Drive-bar and timing shafts*

Drive-bar 17 is a beam extending across the machine and is attached, as indicated above, to the free end of piston rod 18 to be moved thereby. This attachment is made as follows: Through a hole 37 in bar 17 extends the threaded ram 20. Ram 20 is threaded on the outside and is adjustably positioned in bar 17 by means of the lock-nuts 38 and 39. Thus bar 17 may be positioned with respect to the air cylinder 16, and thus with respect to the top bar 6 and table 2 by means of the adjustment provided by ram 20 and nuts 38 and 39.

Also mounted on top bar 6 are the electrical timing switches 40 and 41. These switches are each preferably of the snap-acting kind and are actuated by shafts 21 and 22. Switch 40 is provided with the actuating plunger 42 (see Fig. 3), on the end of which is rotatably mounted the follower 43. Follower 43 bears against a timing rod 44 which is slidably and thus adjustably mounted in a groove 45 provided in shaft 21. Timing rod 44 is provided with a notch 46 of such depth that when follower 43 enters it, the plunger 42 is released to close the contacts of the switch. When follower 43 is out of notch 46, the plunger 42 actuates the said contacts to open them. Timing rod 44 is held positioned in groove 45 by means of the clamp band 47 which encircles the upper end of shaft 21 and rod 44. Thus rod 44 can be adjusted vertically with respect to shaft 21 so that the switch contacts can be actuated at any given position of drive-bar 17 with respect to the table 2.

Switch 41 is a plunger-actuated time delay switch. When the plunger 48 thereof is pushed downwardly, the contacts of the switch close after an interval of time has passed. This may be one of the "dash-pot" time-delay switches, if desired. The contact actuating plunger 48 of switch 41 moves vertically and is actuated by the finger 49 adjustably mounted on shaft 22 in conventional manner by means of clamp band 50. Thus a downward motion of drive-bar 17 will pull shaft 22 downward until at a predetermined position of drive-bar 17 with respect to table 2, finger 49 will actuate switch 41. Fig. 4 is a plan view looking down on shaft 22.

At each end of drive bar 17 is provided a clevis, indicated by numerals 51 and 52 respectively. Mounted in each of clevis 51 and 52 is a roller 53 and 54 respectively which acts as a cam follower in cam levers 55 and 56 respectively.

Mounted on the lower end of ram 20 is the pressure plate structure comprising the upper plate 57 and lower plate 58. Plate 58 is suspended from plate 57 by means of headed guide posts 59 and 60 which are fixed by one end in plate 58 and slide through holes suitably provided in plate 57. If desired, compression springs may be fitted in conventional manner around posts 59 and 60 between plates 57 and 58 to provide pressure against plate 58 by plate 57.

III. Drive cam-levers

Figure 6:
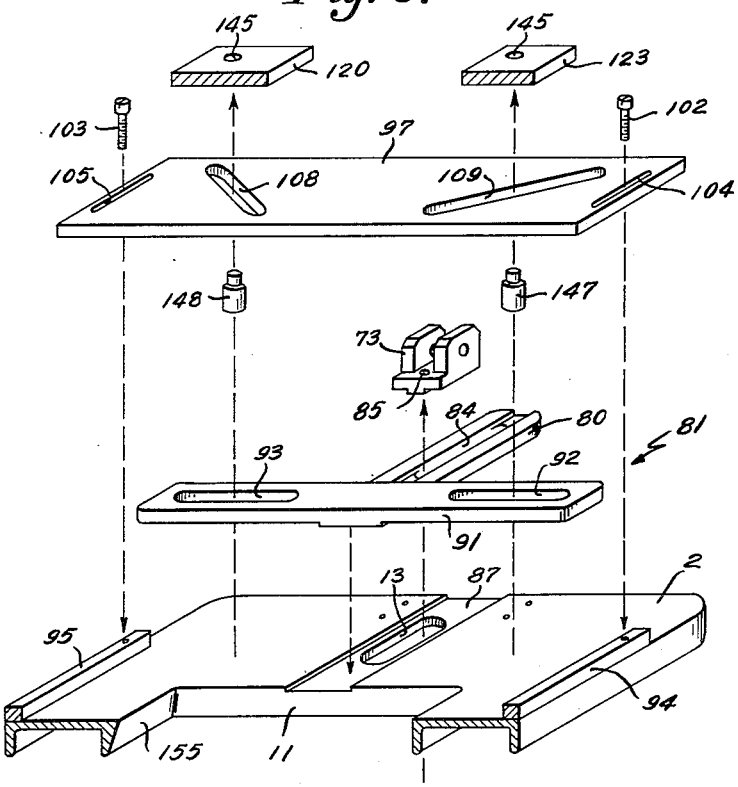
Fig. 6 is an exploded view in perspective of certain parts of the Fig. 1 embodiment, given to show in greater detail certain features of assembly.
Figure 5:
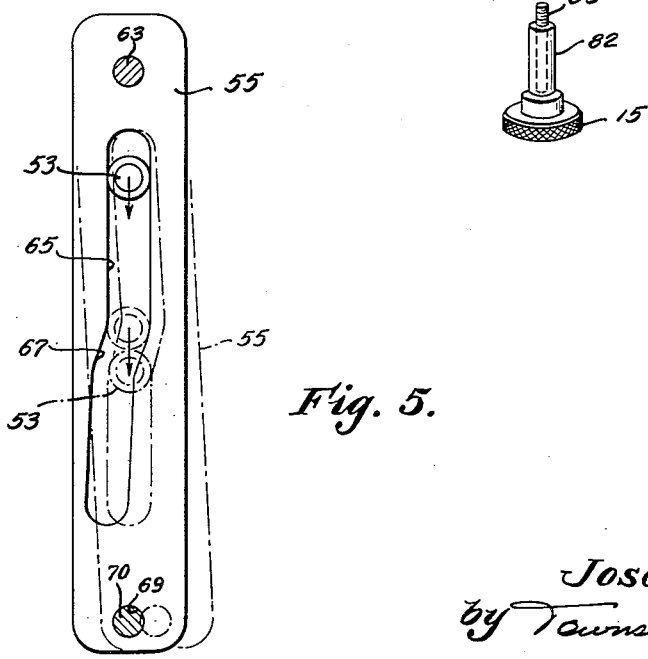
Fig. 5 is an enlarged side view of a cam-lever of this invention, the dotted lines showing a second position thereof.

Cam-levers 55 and 56 are generally flat arms rectangular in cross-section and are pivotally hung from the top bar extensions 61 and 62 by means of pivot pins 63 and 64 inserted in properly provided holes in the extensions. Each of said extensions 61 and 62 is made in this instance in the form of a clevis between the bifurcations of which the upper end of the respective cam-lever is inserted. These extensions may be cast as integral extensions of top bar 6 or may be separately attached thereto by conventional nut and bolt fastenings. A cam slot 65 is cut through cam-lever 55, and a similar cam slot 66 is cut through cam-lever 56, to receive the cam followers 53 and 54 respectively. It will be noted that as the levers are mounted in Fig. 1, the cam slot 65 in cam-lever 55 extends almost directly downward, then has a leftwardly slanting cam rise 67, and then again moves almost directly downwardly; but that the cam slot 66 in cam-lever 56 has its corresponding cam rise 68 projecting toward the right. Thus, as drive-bar 17 moves downwardly, the followers 53 and 54 acting in their respective cam slots 65 and 66 will first (up to the point the followers strike the cam rises) not move the cam-levers, but upon meeting their respective cam rises, the followers will cause the cam-levers to swing inwardly about the pivot points 63 and 64. After the followers have passed the cam rises, no further motion of the cam-arms will take place as the drive bar 17 continues its motion toward table 2. At this point, it is pertinent to point out that that portion of each cam slot lying below its respective cam rise is not centered in the cam lever, but instead slants slightly in the same direction the cam rise slants. The reason for this is that once a follower (number 53, for example) has risen on its cam rise, the cam-lever has changed its angular position as compared to what it was while the follower was above (i. e., prior to meeting) the sam rise. Since, in the operation of other components of this machine it is preferred not to have the cam-levers move further inwardly once the followers have passed the cam rises, the cam slots are preferably slanted as indicated. Fig. 5 shows this construction clearly for cam-lever 55.

It is also well to point out at this time that downward motion of drive bar 17 moves the cam levers inwardly and that upward motion causes them to move outwardly. This motion, as will be explained later, is the motion that is utilized when the machine is used for covering pads. However, when it is desired to use the machine for covering boxes, as will be seen, the cam-levers are reversed (by removing the pivots 63 and 64, and the followers 53 and 54, turning each cam-lever around, and replacing the followers and pivots) so that the cam rises now slant inwardly instead of outwardly as shown. When this reversal is made, then as the drive bar 17 moves downwardly then the action of the followers is to pivot the cam levers outwardly instead of inwardly, the reverse motion taking place as the drive bar 17 moves upwardly.

At the lower end of each cam-lever is provided a hole 69 through which pass the pivot pins 70 and 71 to pivot the lower end of each cam-lever to the bifurcated adjusting plates or clevises 72 and 73 respectively, the ends of the cam arms being pivotally fitted between the upstanding bifurcations of each clevis. Clevises 72 and 73 in turn rest on and are clamped to what will be hereinafter called T-bars. Clevis 72 is clamped to the stem 74 of its associated T-bar (indicated generally by numeral 75) by means of the headed clamping screw 14, the latter being provided with a bushing 76 and having a threaded end 77 which screws into a threaded hole 78 in clevis 72 for clamping purposes, the bushing 76 providing a shoulder for engaging the under side of stem 74. It will be noted that the stem of T-bar 75 is provided with a slot 79 through which the threaded end 77 passes, so that clevis 72 may be adjustably positioned on the stem 74 of T-bar 75 and then clamped in place by tightening clamping screw 14, the T-bar being pressed between the bushing 76 and the bottom of clevis 72. Similarly, clevis 73 is adjustably clamped to the stem 80 of the other T-bar (indicated generally by numeral 81) by means of clamping screw 15 which is provided with bushing 82 and threaded end 83 which passes through slot 84 in the stem 80 to screw into hole 85 provided in clevis 73.

To recapitulate at this point, as drive bar 17 moves downwardly, at first the T-bars remain stationary, but when the cam followers 53 and 54 strike their respective cam rises, further downward motion of the drive bar will cause the cam levers 55 and 56 to move their respective T-bars 75 and 81 inwardly until the followers pass over their rises. Further downward motion of the drive bar does not move the T-bars further inwardly. Upward motion of the drive bar 17 will correspondingly cause the T-bars to slide outwardly. This is with the cam arms arranged as shown in Fig. 1 for pad covering. For box covering, with the cam arms reversed, downward motion of drive bar 17 will cause the T-bars to move outwardly, and upward motion will cause the T-bars to move inwardly. In all cases, it will be observed that the clamping screws 14 and 15 move with the T-bars, this movement being allowed by the aforementioned slots 12 and 13 in table 2.

IV. Wiper means and its associated adjustment

In each end of table 2 is provided a groove in which the stems of the T-bars slide. At the left hand end of the platform (as viewed in Fig. 7) is groove 86 which slidably receives the stem 74 of T-bar 75: and in the right hand end of the platform is groove 87 which slidably receives the stem 80 of T-bar 81. These grooves serve to guide each T-bar in its inward and outward motion. The cross 88 of T-bar 75 rests on table 2, the bottom surface of the stem 74 extending below the bottom of the cross 88 in order to engage the groove 86. Cross 88 is provided with slots 89 and 90 extending through the cross from top to bottom. Similarly, the stem 80 of T-bar 81 extends below the bottom surface of cross 91 of T- bar 81 in order to engage groove 87. Cross 91 is similarly provided with slots 92 and 93 extending through the cross from top to bottom.

Provided along the front edge of table 2 and fastened thereto is a raised runner 94, and a similar runner 95 is provided along the rear edge of the table. These runners will hereinafter be called "cam plate supports." Their height is just slightly greater than the height of the T-bars above the table. Extending across table 2 are the two cam plates 96 and 97, the ends of each cam plate resting on the aforesaid cam plate supports so that each cam plate is mounted above the T-bar at the respective end of the platform. Cam plate 96 is fastened to the cam plate supports by means of cap screws 98 and 99 which pass through slots 100 and 101 at the ends of the cam plates and are threaded into the cam supports. By loosening cap screws 98 and 99, cam plate 96 may be positioned longitudinally with respect to the platform, and then can be fastened in the adjusted position by tightening the screws. Similarly, cam plate 97 is adjustably fastened to the cam supports by means of cap screws 102 and 103 which pass through slots 104 and 105 in the cam plate and are threaded into the cam supports.

Each of cam plates 96 and 97 is provided with two slots numbered, respectively, 106 and 107 for cam plate 96; and 108 and 109 for cam plate 97. These slots are at an angle of approximately 45° to the longitudinal center line of the table 2. Their position and length are such that regardless of the position of the respective T-bars, they at all times over-lap the respective slots in the T-bars. This is, slot 106 overlaps slot 89; slot 107 overlaps slot 90; 108 overlaps slot 93, and slot 109 overlaps slot 92.

Overlying the cam plates are the wipers or finger elements indicated generally by numerals 120, 121, 122 and 123. (See Fig. 16.) These wipers are the fingers which, upon being actuated, slide toward each other to wipe the covering material over the pad into position to be pressed down and struck. Basically, they comprise a set of tongue-and-groove plates in which the tongue of one plate slides in a groove in the adjacent plate so that the central opening formed by the intermeshing tongues can be made larger or smaller. Each wiper is provided with a heating element.

The detailed description of the wipers now follows. (See Figs. 9–14.) Each wiper is a built-up structure as shown. Referring to Fig. 9, there is shown in plan view two wipers in engagement with each other. Referring particularly to the wiper indicated generally by numeral 120, it comprises a relatively thick base plate 124 attached to which is an elongated tongue 125 which does the actual wiping. The wiper tongue 125 comprises the elongated L-shaped heater plate 126 made of a metal, such as brass, which has a relatively high thermal coefficient of expansion, (such as brass, for example), in which is mounted the heater element 127, the heating element being cemented into the grooves 128 and 129 which are machined in the plate, the heating element being insulated from the heater plate by electrically insulating beads in the usual manner, as shown (see Fig. 14). Overlying plate 126 for a portion of its width and for its entire length is the L-shaped cover plate 130 made of a metal which has a relatively low coefficient of expansion (such as Invar, for example), the purpose of which is to help guide the tongue 125 in the adjacent wiper, and also to cover and protect the heating element. Cover plate 130 is firmly fastened to the top of tongue 125 by means of suitable screws extending through the cover plate and into the heater plate 126, as shown. Overlying both the L-shaped tongue assembly and the base plate 124 is the cover plate 131 which is fastened to the tongue and to the base plate by means of screws 132, as shown. The L-shaped tongue assembly 125 is positioned with respect to the base plate 124 so as to leave a space between the back edge 133 of the tongue assembly and the left-hand edge 134 of the base plate 124. This space is partially filled by the reversible corner plate 135 which likewise is fastened to cover plate 131 by means of screws 136. Corner plate 135 has its right and left hand edges (see Fig. 12) chamfered as shown, and one end 137 is formed at an angle in order to provide an obliquely slanted corner in the complete structure. The other end of corner plate 135 has a fin 141 extending therefrom, and this end of the corner plate is chamfered back (see Fig. 14A) as shown. The left hand edge chamfer of corner plate 135 fits a corresponding chamfer on the mating edge of the L-shaped heater plate. The space now left between corner plate 135 and the left hand end 134 of base plate 124 now forms a groove into which slides the tongue 138 of the adjacent wiper 123. It will be observed that the leading edge of each tongue (for example, edge 139 of tongue 138, and edge 140 of tongue 125) is rounded so as to enable the tongue to slide more easily over the article being covered. This rounded leading edge fits into the chamfer of the respective corner plates (for example, edge 139 of tongue 138 fitting the chamfered edge of corner plate 135) as shown.

In similar fashion, each wiper is constructed with its base plates, heater plates, and cover plates, and slides into a matching groove provided in the succeeding wiper while receiving the tongue of the preceding wiper. Thus wiper 121 has tongue 142, wiper 122 has tongue 143, and wiper 123 has tongue 138 (see Fig. 16). Thus the wipers, when assembled together, define a central opening, the size and shape of which may be varied by sliding the wipers toward or away from each other.

As drawn, the several corner plates are positioned so that the obliquely angled ends form the corners of the central opening defined by the tongues. With this arrangement, the wiper assembly is used to cover pads having the corners cut off at an angle (see Fig. 29), the angled corner 137 being suitable to wipe over the angled corner of the pad. However, when a pad having 90° corners is to be covered, the four corner plates 135 are removed, and placed back in position with the finned ends 141 now forming the corners. The fins 141 now extend a short distance away from each corner along the tongue of the adjacent wiper, and these fins prevent the covering material from being caught in the crevice between the corner plate and the tongue. The backward chamfering at the finned end gives additional room for the more bulky folds of covering material at the corners to lay back until pressed down by the wiping action.

Attention is also directed to the bimetallic nature of the wiper tongues. Each tongue essentially comprises a heated thermostatically acting plate, the high expansion material of the heater plate 126 causing the center of the tongue to bow slightly downward when the tongue becomes heated. The purpose of this is to make sure that the central area of each tongue will exert the proper pressure on the pad when wiping occurs, it being realized that in a wiping operation (for example, when covering a large pad) the tongue may be pressed down only at its extremities, namely, one end being attached to its respective base plate, and the other end being pressed down by the adjacent wiper base plate. This would leave the central portion of the tongue unsupported, and the downward bowing is such as to give additional wiping force at this central portion.

Figure 15:
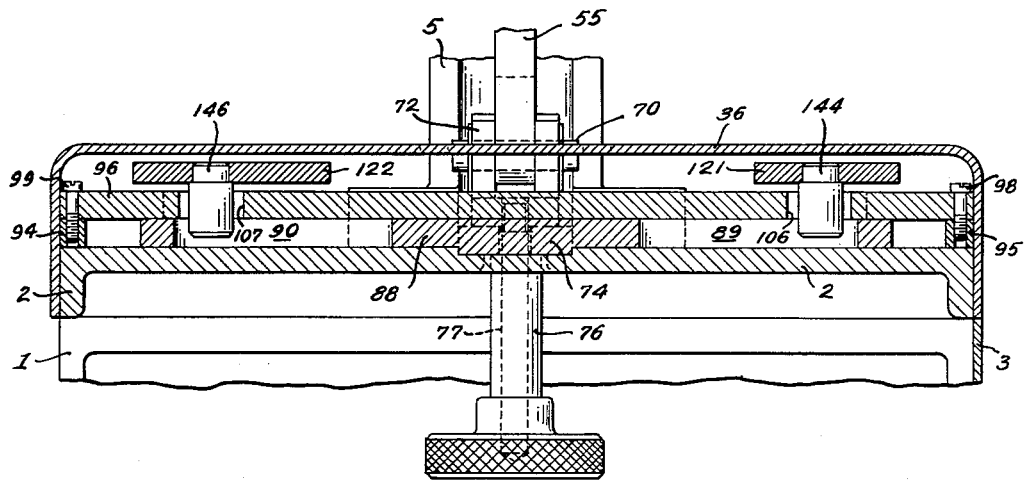
Fig. 15 is a cross-sectional elevation, side view, of a portion of the table assembly, taken in the direction of sight lines 15—15 on the Fig. 7 view.

These wipers are connected to the T-bars and are actuated thereby in the manner now to be described: Referring primarily to Figs. 7, 8 and 15, and having particular reference to wiper 121, a stud 144 is fastened to wiper 121 by being press-fitted into a hole 145 provided in the wiper in such a position as to overlap both slot 89 in T-bar 75 and slot 106 in cam plate 96. Stud 144 projects downwardly and slidably engages slots 89 and 106. In similar manner, stud 146 is fastened in wiper 122 and projects downwardly to engage slidably slots 90 and 107; stud 147 is fastened in wiper 123 and extends downwardly to engage slidably slots 92 and 109; and stud 148 is fastened to wiper 120 and extends downwardly to engage slidably slots 93 and 108. The diameter of the several studs is such as to closely but slidably engage the respective slots.

Figure 16:
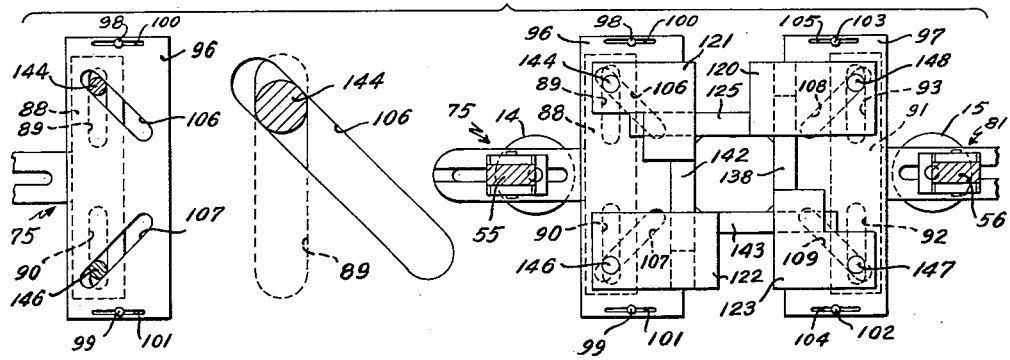
Figs. 16, 17 and 18 are schematic representations of the cam plate and wiper mechanism, given to show certain motions of the elements thereof.
Figure 17:
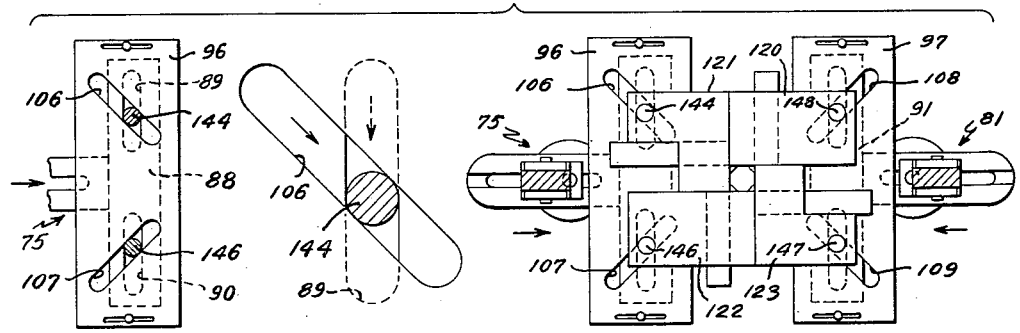
Figure 18:
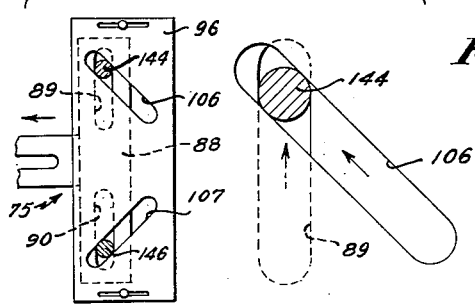

It will now be observed that motion of T-bar 75 inwardly, for example, will cause studs 144 and 146 to move inwardly, but that the 45° angled slots 106 and 107 in cam plate 96 will force studs 144 and 146 in a 45° direction inwardly toward each other. However, since studs 144 and 146 are fastened to wipers 121 and 122 respectively, these wipers are also moved inwardly and toward each other along the angle determined by the slots in the cam plate. Similarly, motion of T-bar 81 inwardly will force wipers 120 and 123 inwardly toward each other at the angle determined by slots 108 and 109 in cam plate 97. Figs. 16–18 show these motions graphically, Fig. 16 showing the position of the parts at the start of a cycle with drive bar 17 up, and Fig. 17 showing the positions with the drive bar down. (It is to be noted that in Figs. 16–21 the motions of the several parts are greatly exaggerated for purposes of illustration.)

Thus, motion of drive-bar 17 toward the table 2 (as drawn in Fig. 1) will cause the wipers to move toward each other when the followers 53 and 54 strike the cam rises 67 and 68, through the linkages afforded by the cam arms, the T-bars, the cam plates, and the studs.

The adjustment of the wipers to space them for the length and width of the pad (and also the box) to be covered will now be described: The first adjustment can be for length, that is, the position of the tongues of wipers 121 and 123 in respect to each other is to be set. (See Figs. 19–21.) The screws 98, 99, 102 and 103 are tightened so as to hold the cam plates immovable. Then starting with Fig. 19 which shows a position before adjustment, the adjusting screws 14 and 15 are loosened slightly so as to unclamp the clevises 72 and 73 from their respective T-bars 75 and 81. The T-bars are then moved either toward or away from each other, as the occasion demands, until the inner ends of wiper tongues 142 and 138 are the proper distance apart. Fig. 20 shows an adjustment with T-bars having been moved apart. That this motion of the T-bars will move the wipers 121 and 123 toward or away from each other is obvious from the consideration that the slots 89 and 90 in the T-bars are perpendicular to the motion of the T-bars, that is, run from front to back. (Of course, wipers 120 and 122 will also move toward or away from each other, but this is only incidental to the setting for length.)

With the position of wipers 121 and 123 adjusted, clamp screws 14 and 15 are tightened to hold the T-bars in their adjusted position with respect to the cam-arms 55 and 56. Then the screws 98, 99, 102 and 103 are loosened to unclamp the cam plates from the cam plate supports 94 and 95. The cam plates are now moved toward or away from each other to move the wipers 120 and 122 toward or away from each other. That this wiper motion will ensue follows logically from a consideration of the combined effect of the 45° slots in the cam plates and the slots in the T-bars. Since the T-bars, and hence their slots, are fixed, the path of the studs 144, 146, 147 and 148 is determined. They must move in the T-bar slots and hence toward or away from each other in a direction perpendicular to the length of the table 2, that is, from front to back. Therefore, when cam plate 96, for example, is moved to the left in Fig. 21, the intersection of the slot 90 with slot 107 takes place further in toward the center of the slots, as shown in Fig. 21. Since the position of stud 146 is controlled by this intersection, stud 146 also moves inwardly toward the corresponding stud 144 carrying with it the wiper 122. Similarly adjustment of cam-plate 97 will adjust wiper 120 and its tongue 125 with respect to tongue 143 of wiper 122.

After the cam-plates are adjusted to give proper front-to-back separation of tongues 125 and 143 (i. e., the width of the pad), the screws 98, 99, 102 and 103 are tightened to lock the cam plates in position.

It will be observed that if length is adjusted first, the T-bar slots are thereafter fixed, and hence the adjustment for width does not change the previously made length adjustment.

The temperature of the wipers is controlled by mounting in one of the wipers a thermally sensitive bulb 149, the tube 150 of which connects to the control thermostat 151, the latter being mounted on table 2 in a convenient place, as shown in Fig. 7. Also mounted on table 2 are the outlets 152 into which the heating elements may be plugged. An on-off power switch 153 is mounted on table 2, and serves to connect and disconnect the machine from the power lines. The heaters are connected to outlets 152 by wires 154.

*V. The discharge platform or door*

As has been indicated above, the table 2 is provided with a generally centrally located opening 11. This may advantageously be of square or rectangular shape, and should be larger than the largest pad or box to be covered by the machine, since through it will be ejected the covered article. In the present instance, this central opening is provided with the downwardly projecting peripheral lip 155 which is cast and machined to shape as an integral part of table 2. Pivoted to a pair of brackets 156 and 157 which depend from the underside of table 2 is a platform or door 158, this door being hung on the aforesaid brackets by means of the pin 159 which passes through the downwardly extending edges 160 and 161 of the door and the brackets. It will be noticed that the pivot holes 162 in brackets 156 and 157 are elongated. The door is thus enabled to swing up or down when actuated, and also can move vertically up and down. Also located on the under side of the door is the downwardly projecting plate 163 which is of a size to slidably fit between the bifurcations 164 and 165 of the clevis 166 to form a knuckle-joint, the joint being held together by means of pin 167. Clevis 166 is fastened to the piston rod 168 of cylinder 8 by means of a conventional threaded connection with a lock-nut. When air is forced into cylinder 8, the piston thereof will swing door 158 upward until it closes (from below) the central opening 11. Reversing the flow of air in the cylinder will swing the door downwardly.

Figure 22:
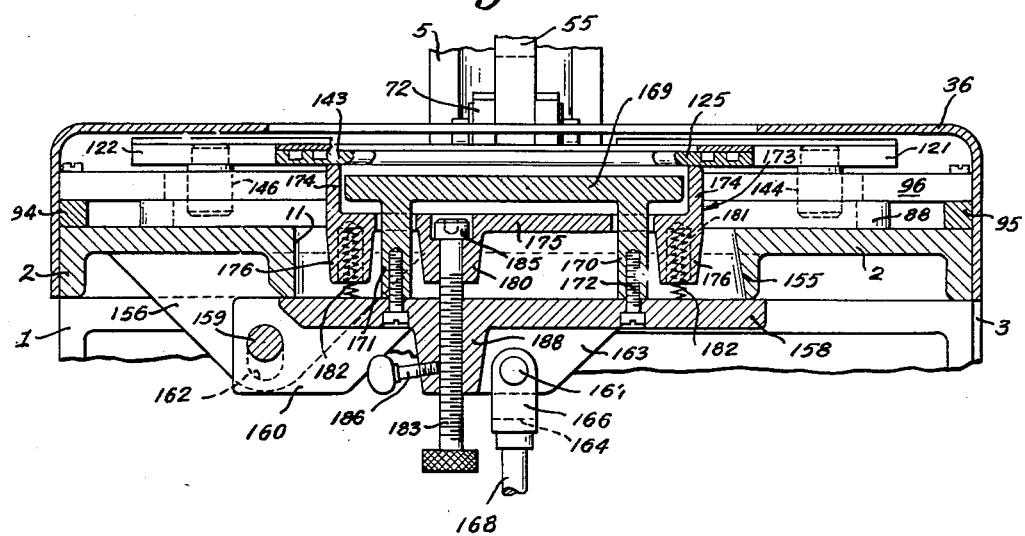
Fig. 22 is a cross-sectional elevation of a portion of the table assembly, taken in the direction of sight lines 22—22 on Fig. 8.

It will be observed (see Fig. 22) that when door 158 swings upwardly it comes to rest against the bottom edges of the aforesaid lips 155, that is, the top of the door is some distance below the top of table 2. The purpose of leaving this space is to be able to mount on the door pressure pads or other form pads to adjust the machine to different thicknesses and shapes of pads or boxes which are to be covered, and also to provide further adjustable supporting means as will now be described:

A form holding means is provided consisting of a sub-table 169 having the downwardly extending legs 170 and 171. These legs are of such a height that when sub-table 169 is fastened to door 158, the top of the sub-table will be raised above the top of table 2, as shown in Fig. 22, but level with the tops of the cam plates 96 and 97. Sub-table 169 is firmly fastened to the door 158 by means of screws 172 which pass through the door and into the legs as shown. A pad spacer 173 is also attached to door 158 for the purpose of holding the wiper tongues up so they will pass over the edges of the pad being covered. Spacer 173 has an upstanding peripheral lip 174 which defines a peripheral shape corresponding to the shape of the central opening 11 and fits slidably therein as door 158 swings up. It also has the central bed 175 and the four downwardly extending legs or bosses 176 (one at each corner), as well as the downwardly extending boss 180. (It will be noted that the legs 176 and boss 180 of the sub-table 169 loosely pass through suitable holes provided in the bed 175, the sub-table 169 lying above the bed 175.) Each of legs 176 is provided with a recess 181 which receives a compression spring 182. These compression springs support, springingly, spacer 173 on the door 158. An adjusting screw 183 passes slidably through a hole 184 provided in boss 180 and is provided with a head 185 to enable the bolt to engage the central bed 175. Screw 183 is threadably received in a boss 188 provided on the under side of door 158. A thumb-screw 186 extends through the wall of boss 188 to engage a screw 183 to keep it from turning once it has been adjusted. By the arrangement, the position of the top edge of lip 174 with respect to the top of sub-table 169, may be adjusted. The tongues of the wipers rest on lip 174 and thus the spacing between the tongues and sub-table 169 may be adjusted to allow the wipers to pass over the material to be covered. The opposing action of the compression springs 182 and adjusting screw 183 holds the spacer 173 resiliently in the adjusted position.

With this construction, it will be observed that the wipers are supported by the lip 174, so that the wipers are free to slide back and forth to wipe covering material over the form being covered.

A discharge chute 187 is fastened to table 2 in such position that when door 158 is swung open, a pad resting thereon may be slid off into the chute.

*VI. Electrical circuit*

The wiring circuit for the pad machine will be described at this point, since it is simplest and with it the basic operations of the machine can be better understood.

Figure 23:
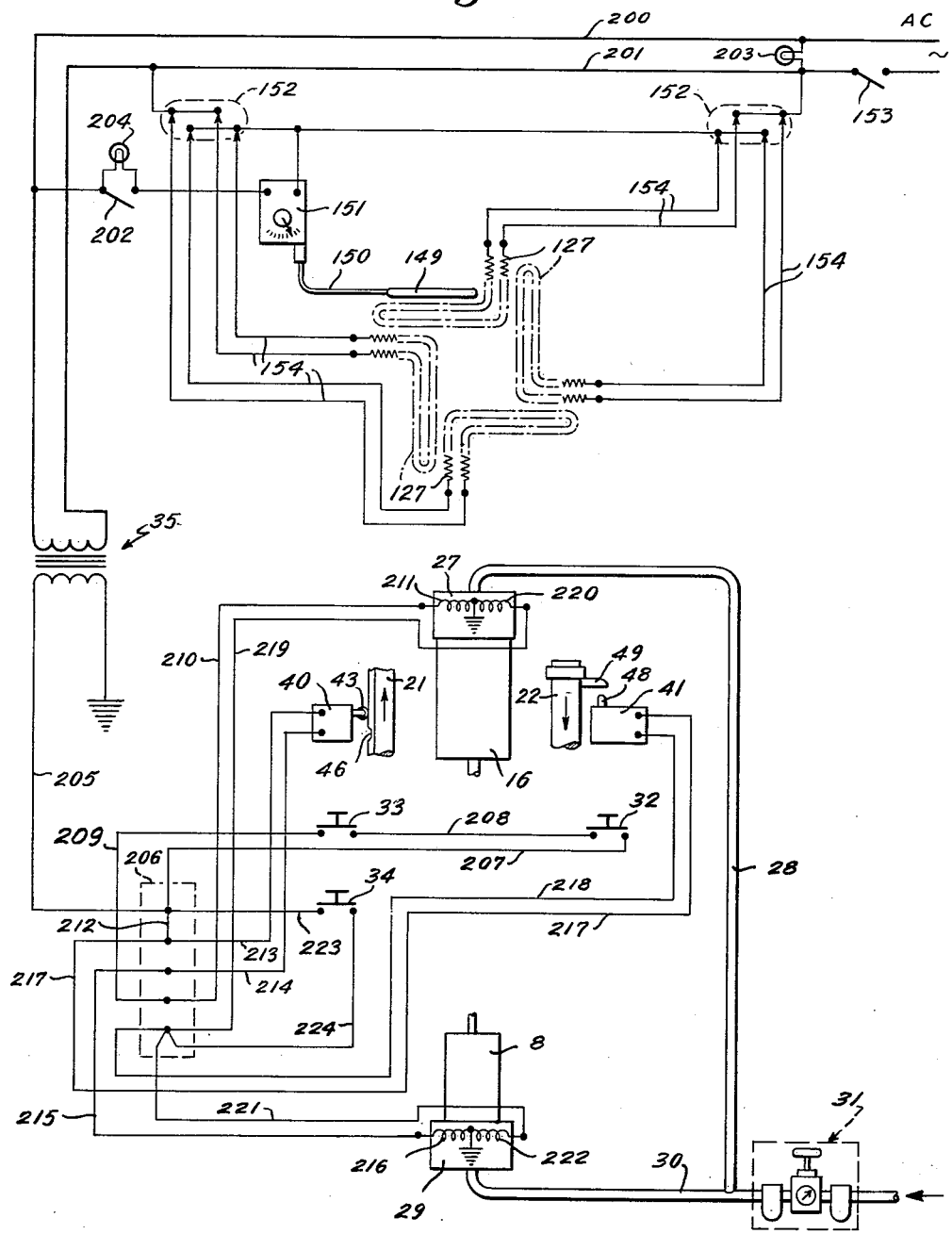
Fig. 23 is a wiring diagram of the Fig. 1 machine when used to cover pads.

Referring to Fig. 23 in which is shown, partly schematically and partly pictorially, the pad machine wiring diagram, the power source is indicated by A. C., and it is connected by wires 200 and 201 to the primary of transformer 35. The main line switch 153 is shown, as well as the heater switch 202. Signal lights 203 and 204 may also be connected in, if desired.

In describing this circuit, for simplicity's sake, one connection is indicated as a ground connection, the corresponding ground being indicated where necessary. Several connections are made by terminal board 206. The drive cylinders are powered with low voltage from the secondary of transformer 35. The start switches 32 and 33, as well as the stop switch 34, are open. With drive bar 17 in its uppermost position, follower 43 is below cam notch 46 in timing rod 21, so that switch 40 is open. Finger 49 is up so that switch 41 is open. Upon pressing both start buttons (32 and 33) current flows from transformer 35 through wires 205, 207, start switch 32, wire 208, start switch 33, wire 209, and wire 210 to the solenoid 211 in valve 27 that causes the piston rod of cylinder 16 to move downwardly carrying drive bar 17 (and thus timing shafts 21 and 22) with it. As pointed out previously, these valves are such that they are operated by momentary impulses. Thus, switches 32 and 33 may now be released and the piston of cylinder 16 will continue to move downwardly. As timing shaft 21 moves down, follower 43 drops into notch 46, and switch 40 closes its contacts momentarily. By so doing, current is allowed to flow by wires 205, 212, 213, switch 40, wire 214, and 215 to the solenoid 216 of valve 29 to cause the piston rod of cylinder 8 to move upwardly to close door 158, if this door is not already closed.

Both piston rods continue to advance toward each other, drive bar 17 (in its downard path) causing the T-bars to move the wipers inwardly. When drive bar 17 has moved down a predetermined distance, finger 49 pushes the plunger of switch 41 and after a predetermined delay time, the contacts of switch 41 close. When switch 41 closes, current is allowed to flow as follows: by wires 205, 212, 217, switch 41, wire 218, and wire 219 to the solenoid 220 of valve 27. This is the solenoid that causes sthe piston of cylinder 16 to retract. Current also flows to valve 29 as follows: by wires 205, 212, 217, switch 41, wire 218, and wire 221 to solenoid 222 of valve 29 to cause the piston of cylinder 8 to move downwardly and thus open the door 158 to allow ejection of the covered form.

It will be noted that as drive bar 17 moved downwardly, it momentarily closed switch 40. This switch remains open for the rest of down stroke, and thus prevents current from being continuously applied to solenoid 216.

It will be noticed that on its return trip upward, timing shaft 21 moves upwardly far enough to let follower 43 drop momentarily into notch 46 and then the follower is pushed out again. This momentary closing of switch 40 energizes solenoid 216 to close door 158 again. Thus, door 158 is closed while the drive bar 17 is in its uppermost position, thus permitting use of the sub-table 169 as a loading platform for the next pad to be covered.

If at any point in the cycle it is desired to return drive bar 17 to its uppermost (or neutral) position, all that is necessary is to close stop switch 34 momentarily. By so doing, current flows by wires 205, 223, stop switch 34, wire 224, and wire 219 to the retract solenoid 220 of cylinder 16; and by wire 221 to the retract solenoid 222 of cyldinder 8.

The heating elements 127 are connected, as shown, to the power supply by means of plug connections into outlets 152, these connections being made with flexible wires 154 so as to permit free motion of the wipers.

*Adjustment and operation for pad covering*

Turning now to Figs. 24, 25, 26 and 27, the adjustments of the machine and its operation for pad covering will be described.

As described above, the adjustment of the wipers to conform to the shape of the pad may be done through the adjustable clevises 72 and 73 on the T-bars and by the adjustable cam-plates 96 and 97. Therefore, with the drive bar 17 in its uppermost position and door 158 closed, a pad (generally a square or rectangularly shaped piece of cardboard) is laid on the sub-table 169 centrally located beneath the ram 20, and by the aforesaid method, the tongues 125, 142, 143 and 138 are brought together until the inner edge of each tongue touches or approximately touches the edges of the pads. In addition, screw 183 is adjusted to vary the height of lip 174 above the top of sub-table 169 until the until the wiper tongues are able to slide over the pad and covering material without hindrance. With this adjustment made, the heaters are turned on and the main power switch is closed. When the wipers have reached a temperature so that they will soften the adhesive which covers the pad (and/or covering material), a piece of covering material 230 is laid across the tongues approximately centrally beneath the ram 20. A pad 231 is now laid on top of the material 230 and is pressed down to carry the cloth (and the pad) into the recess defined by the edges of the wiper tongues and the top of sub-table 169. Reference to Fig. 24 will show the pad and covering material in this position. Fig. 29 shows the pad laid on the covering material (full lines) and the upstanding covering material (dotted lines) after the pad has been pressed down as described. It will be noticed that the edges of the covering material are forced to stand somewhat erectly as they lie against the inner edges of the tongues.

The start switches 32 and 33 are now pressed to start the cycle. As aforesaid, the piston rod of the top cylinder 16 will move downwardly, carrying drive bar 17 with it. As this downward motion continues, a rubber pressure pad 232 which has been mounted on lower plate 58 comes in contact with pad 231 and thereafter acts to hold pad 231 stationary, the drive bar 17 having moved far enough down to exert some pressure. This position is indicated by the dotted lines in Fig. 24, and it will be observed that the followers 53 and 54 are about to meet their respective cam rises (follower 54, cam-lever 56, and cam rise 68 being shown in Fig. 24). As the drive bar 17 continues to move downwardly, the cam-levers 55 and 56 force the T-bars and hence the wipers toward each other, so that the tongues of the wipers advance over the pad to wipe over and to press down the covering material. Fig. 25 is an enlarged section of Fig. 24 to show the bulging outward of the rubber pressure pad 232 as the drive-bar 17 moves down. Fig. 26 shows the tongues of the wipers having been moved inwardly so that they have ironed down the edges of the covering material. The drive bar continues to move downwardly, and since the followers 53 and 54 have passed their cam rises, the wipers do not continue to move inwardly. Finally, the drive bar moves down far enough to bring together plates 57 and 58 so as to apply direct pressure from ram 20 onto the covering material and pad, this pressure being applied as plate 57 presses plate 58 onto the wiper tongues, which in turn press against the pad and covering material. It will be observed that the pad-spacer 173, because of its resilient mounting, permits the wiper tongues to be depressed to accomplish the above pressing operation, the wipers tilting and lifting slightly because of the loose fit of the studs 144, 146, 147 and 148 in their slots. The pressing effect is shown in enlarged detail in Fig. 28.

Finger 49 has been previously adjusted so that it pushes the plunger of switch 41 after plates 57 and 58 have pressed down on the wiper tongues. After a predetermined time delay sufficient to make tacky or set the adhesive on the pad (and/or the covering material), switch 41 closes its contacts to start the retract motion of cylinder 16 and to open door 158. Ram 20 moves up varying with it the plates 57 and 58 and the pressure pad 232; door 158 opens to the chute 187 and the covered pad slides (or may be blown if desired) off sub-table 169 into the chute, as shown in dotted lines in Fig. 27.

As explained above, ram 20 and drive bar 17 move up to the neutral or starting position, meanwhile energizing switch 40 momentarily to close door 158 again. The machine is now ready for another loading.

The finished pad is shown in Fig. 30. The covering material is shown as having been pressed down and ironed to set the adhesive, and it will also be noticed that the corners 233 of the covering material are pleated. This effect is obtained by the action of the corner pieces 135, which, as indicated above, have their ends 137 formed obliquely. As the wipers move inwardly, these oblique ends have the effect of moving inwardly along the corner line, and hence iron the folds of covering material at the corners as shown.

It will be noticed that the machine is loaded from the top, and that ejection of the finished pad takes place underneath table 2, and thus the top of the table is not cluttered with covered pads. Also, it is to be noted that ejection is automatic, and that all the operator has to do (after the machine is adjusted) is to load a pad and covering material, and the machine does the rest. These features represent a considerable saving in time, and a great convenience for the operator.

It is also to be noted that because the inner support for the wiper tongues is the depressible pad spacer 173, the tongues may be depressed also under the ram pressure to insure a good pressing and ironing action.

*Box machine*

The changes necessary for adapting the machine to the covering of boxes will now be described.

Referring to Figs. 31–36, and first to Fig. 31, the drive bar 17, top bar 6, columns 4 and 5, extensions 61 and 62, timing shaft 22, cylinder 16, valve 27, and ram 20 of the already described machine are shown. These remain unchanged. The cam-levers 55 and 56 are shown as having been reversed so that the cam-rises 67 and 68 now slant inwardly. This change is made, as described above, by removing the pins 63 and 64, the followers 53 and 54, then turning the cam-levers around and replacing these parts. Timing shaft 21 of the pad machine is removed, and a new timing shaft 235 is installed. Timing shaft 235 actuates three switches 236, 237, and 238 (of the kind having their contacts closed when the plungers are released, and the contacts open when the plungers are pushed in) by means of three timing rods 239, 240 and 241, respectively, mounted in suitably provided grooves in the timing shaft, just as described for timing shaft 21. In each of these timing rods, notches are provided for actuating the switches, the switch plungers being provided with suitable followers as described for switch 40. (Switch 41 of the pad machine may, if desired, be removed from the machine, as indicated, or may be left in place and disconnected by any conventional means.) Or, if desired, instead of there being three switches associated with timing shaft 235, only two switches need be associated with the latter and the third switch may be used in conjunction with the other timing shaft. In the latter case, however, a new timing shaft would have to be inserted and having a timing rod mounted therein. For this reason, I prefer to insert only one timing shaft and have it operate all three switches. In regard to the cam notches in the timing rods, the notch in rod 239 is near the top of the timing shaft so as to receive the followers of switch 236 when drive bar 17 is somewhat up from the bottom of its stroke, but has moved down far enough to deposit a box in die plate 253 with the upper edge of the box slightly below the top of the die plate. The notches in timing rods 240 and 241 are placed as is notch 46 in rod 44; that is, rods 240 and 241 are so adjusted that when the drive bar 17 is in its topmost or neutral position, the switch followers are out of the notches and below the notches. The notch in rod 241 is adjusted so as to be slightly higher than the notch in rod 240. Thus, as drive bar 17 moves down, the plunger of switch 237 is momentarily actuated first, then the plunger of switch 238 is momentarily actuated, and finally (as drive-bar 17 moves further down to approach table 2) the plunger of switch 236 is actuated. Thus switches 237 and 238 are never both closed at the same time.

It should be noted that the cam-notch in rod 239 is made long, and the position of the rod is adjusted, so that switch 236 is actuated at a point in the stroke of ram 20 which still leaves a short distance for the ram 20 to continue further on down. (It will be noted later that for this continued downward motion of the ram, switch 236 must remain actuated by its cam-notch, and hence the cam-notch in rod 239 is made long enough to permit this.)

Another change occurs in respect to the type of attachment used at the end of ram 20. (See Figs. 32, 33 and 34.) In the machine adapted for covering pads, a pressure plate system is used; here, a box holding and heating form is used, as follows:

Attached by conventional means to the end of ram 20 is a box-holding means or block 242 whose under surface is curved to fit the curvature of the box to be covered. This is a metal block which has inserted in its interior the heating elements 243 and the thermally sensitive bulb 244, the former to heat the block and the latter, in conjunction with control unit 151, to control the temperature of the block. Since the method of mounting the heaters and bulb is conventional, these elements are illustrated only schematically on the drawings by dotted lines. Also mounted by conventional means in the face of block 242 are the permanent magnets 245, whose purpose is to hold a box onto the block temporarily. The relationship of the sizes of the block 242 and the box is such that the box slips easily up onto the block but is close enough thereto so that when, later in the operation of the machine, the block will be again inserted into the box, the block will press covering material tightly against the inside of the box walls.

Surrounding block 242 is a pressure plate 246 which, as shown, is an open metallic frame whose inside dimensions are slightly larger than the block's dimensions so that the frame may slide up over the block as shown in Fig. 34. Frame 246 is supported on the block by means of hangers 247 which are fastened to the frame, one at each end thereof. An extension 248 extending inwardly as a part of each hanger enables the block to carry the frame up and down with it. Corresponding extensions 249 (also a part of each hanger) have fastened thereto the guide rods 250 which slidably fit holes suitably provided in drive bar 17. These rods 250 guide the pressure plate 246 in respect to block 242. Springs 251 are provided as shown to provide a downwardly directed force on the pressure plate. As shown in Fig. 34, the pressure plate 246 may be pushed upwardly against the resistive force of these springs.

In addition to the above changes, certain changes are made in regard to the table 2 and door 158. The sub-table 169 and pad spacer 173 are removed, and a rubber pressure pad 252 is mounted on the door. Pad 252 preferably has its upper surface curved to fit the shape of the box to be covered. A die plate 253 is provided which has a central opening 254 to receive the box, this opening being so sized that it will receive snugly a box with covering material on the outside of the box. The snugness of the fit is indicated by the fact that the bottom edge 255 of die plate 253 acts as a stripper to strip the covered box from block 242 at the end of a covering cycle. That is, the fit of the box plus its covering material is tight enough in opening 254 so that when a covered box is pushed down all the way through opening 254, the box sides will expand slighlty so as to enable the bottom edge 255 to push the box off the block 242 on the upward stroke of the ram. Die plate 253 extends across table 2 from front to back, and rests on the cam plate supports 94 and 95 to which it is fastened by screws (not shown). The upper edge of central opening 254 is rounded slightly to permit the box and covering material to be drawn down smoothly. It will be noticed that the thickness of die plate 253 is the same as cam plates 96 and 97 so that the wiper tongues can slide freely over the die plate. Overlying the wiper tongues is a draw plate 263 which also has a central opening 264 the same size as opening 254. The edges of the plate 263 which define this opening are rounded and highly polished. Plate 263 is the draw plate against which the pressure plate 246 presses to slidably hold the covering material as it and the box are pushed into die plate 253. Plate 263 (like die plate 253) extends across the table from front to back and is supported by and fastened to spacers (not shown) at each end which space the draw plate above die plate 253 a sufficient distance to permit the wiper tongues to slide between the two plates.

As to the door 158, a bracket 257 is mounted thereon in conventional manner (as by screws 258) and is positioned so that its upstanding leg 259 projects beyond the edge of the door. Leg 259 serves as an actuator for the plungers of the switches 260 and 261 which are mounted on the underside of table 2 by the bracket 262, and which are so positioned in respect to the door and leg 259 that the leg 259, on the door's swinging closed from an open position, first pushes the plunger of switch 261, releases this plunger, and then (with the door in its fully closed position) pushes the plunger of switch 260 and holds it there. Switches 260 and 261 are of the type having contacts which are normally open but whose contacts close as the switch plungers are pushed in. Thus, as the door closes, the contacts of switch 261 are first closed momentarily, then opened, and the contacts of switch 260 then are closed and held closed. When the door is pushed downwardly by the ram during the ejection part of the box covering cycle (see the remarks regarding the slotted pivot-pin hole 162), the contacts of switch 260 are first opened (as leg 259 moves downwardly), and then the contacts of switch 261 are closed. When the door finally swings open to permit a covered box to be ejected, the contacts of switch 261 are then opened.

In regard to the adjusting of the machine for covering boxes, the position of the wipers 120, 121, 122, and 123 is different from the neutral position of these wipers in the machine as used for pads. In this case, when the drive bar is in its uppermost or neutral position, the wipers must be in toward the center so that as the drive bar moves down, the wipers will be moved out. Then as the drive bar 17 moves up again, the wipers must move in, but move out as the drive bar comes down again.

This explanation is made clearer if the cycle of the machine is described, as follows. A box is placed over block 242, and a piece of covering material of the right size is placed over the central opening 254 (resting on the draw plate 263). The start buttons are pushed, and drive bar 17 moves downwardly. The cam-rises 67 and 68 are now so slanted that as the drive bar moves down past them, the cam-levers 55 and 56 move out, thus moving the wipers outwardly. This clears the way for the ram and block 242 to deposit the box in the central opening 254, the box (as it is pushed into opening 254) carrying the covering material with it. As the box is pushed in, pressure plate 246 acts to restrain the covering material so that it is pulled smoothly into opening 254 around the box. Next, the ram moves upwardly leaving the box in the die block 253. When drive bar 17 passes the cam rises 67 and 68 on this upward stroke, the wipers are forced inwardly to wipe the covering material over the edges of the box.

Ram 20 now moves down again and the wipers, of course, move out. This leaves the covering material bent over the edges of the box, and block 242 now enters the box again, this time to wipe the covering material down over the inside walls of the box. The ram continues its downward motion, pushing downward the door 158 against the resistance offered thereto by cylinder 8. (See note above regarding the size and relative strengths of the cylinders.) This forces the surface of the box firmly against the pressure pad 252 to iron out the covering material on the surface of the box. When door 158 has been pushed far enough down to release switch 260 and actuate switch 261 (the box meanwhile having been pushed clear of the central opening 254), the ram starts upwardly again. The edges 255 now strip the box from block 242, and the box falls into the chute 187, the door meanwhile having been swung open by cylinder 8. The ram meanwhile continues upwardly (moving the wipers in) until finally the drive bar 17 reaches its neutral position. At that point the cycle stops, and the machine is ready for another loading.

Thus it is seen that while in the pad machine, during a cycle, the wipers first move in once and then out once; in the box machine, the wipers first move in, then out, and then in again.

Turning now to Fig. 37 for an explanation of the electrical circuit used for the machine when used to cover boxes, again I have preferred to use low voltage for the operation of the valves and the relay. The heaters for the block 242, and the temperature control may be as described for the pad machine, together with main power switches, heating element switches, signal lights, etc.

The power source is again indicated by A. E. and feeds into the transformer 265. (Again, for simplicity's sake, the connections for only one side of the circuit have been drawn, the power return circuit being indicated by the ground connection.) The stop switch 266, and the start switches 267 and 268 are provided. Stop switch 266 has an internal connector 269 so arranged that when the contact arm 270 of the stop switch is pushed down, power is fed from wire 273 to terminals 271 and 272 of this switch. Start switches 267 and 268 are the type used before, and are series connected so that both switches must (for safety's sake) be pushed to start the machine.

Therefore, to start the cycle of operations, stop switches 267 and 268 are pushed down. Current then flows to the advance solenoid of each valve (solenoid 211 in valve 27, and solenoid 216 in valve 29) to move the respective pistons toward table 2. As to solenoid 211, current flows by wire 273, through stop switch 266, wires 274 and 275, start switch 267, wire 276, start switch 268, wire 277, and wire 278; as to solenoid 216, current flows thereto from wire 277 by wires 27 and 280. This starts drive bar 17 down, and door 158 up. The start buttons are held in the down position (as drawn) until the door 158 closes. During its closing, the door will momentarily close switch 261. However, no change in the circuit takes place because any current which is to flow through switch 261 must come either through switch 260 (which is open when switch 261 is closed, and vice versa) or from the back (upper as drawn) contacts of the start switches (which contacts are now open). The start buttons may now be released. Meanwhile the piston of cylinder 16 continues to move downwardly, momentarily closing switch 238, opening it, and then momentarily closing and opening switch 237. The momentary closing of each of these switches makes no changes in the circuit, because any current through switch 238 must come from switch 237, and as explained before, these switches are not closed at the same time. Hence the relay 285 remains deenergized.

The ram of cylinder 16 continues to advance downwardly until the block 242 carrying a cover deposits the cover in the die plate 253 together with the covering materials; the upper edge of the box being slightly below the top of die plate 253. At this point, the follower of switch 236 drops into the cam-notch of its timing rod 239 to close the contacts of this switch. With this switch closed, current flows to the retract solenoid 220 of cylinder 16 by wire 273, stop switch 266, wire 274, start switch 267 (back contacts), wire 281, wire 282, wire 283, terminal 284 of the relay indicated generally by numeral 285, the relay being double-pole, double throw, relay switch arm 286, relay terminal 287, wire 288, switch 236, wire 289, and wire 290. This actuates retract solenoid 220 of valve 27, and the ram 20 and drive-bar 17 move upwardly, forcing the wipers inward, and moving the timing shafts up.

Switch 236 now opens, and timing shaft 235 moves up until the follower of switch 238 drops into its cam-notch to close the contacts of this switch. (It is to be noted that the position of the cam-notch for switch 238 has been previously adjusted so that the drive bar 17 has passed the cam-rises in the cam-levers on its upward journey before switch 238 is actuated.) When switch 238 closes, the relay 285 becomes energized by current flowing to it through wire 273, stop switch 266, wire 274, start switch 267, wire 281, start switch 268, wire 282, wire 291, wire 292, switch 260, wire 293, wire 294, wire 295, switch 238, wire 296, terminal 297 of relay 285, and wire 298 to the relay coil 299. The switch arms 286 and 300 of the relay now move to the right (from the relay-de-energized position shown), and it will now be observed that there is a holding circuit established to the relay coil as follows: From the grounded side of the relay coil 299 through the coil by wire 298 to terminal 297, relay switch arm 300, relay terminal 301, wire 302, wire 293, switch 260, wire 292, wire 291, wire 282 to start switch 268 and so to the transformer. Thus, as long as the door maintains switch 260 closed, the relay remains energized.

Meanwhile, the piston of cylinder 16 and drive bar 17 with timing shaft 235 has continued to move upward. The follower of switch 237 now drops into its notch, and current now flows to the advance solenoid of valve 27 again as follows: through the stop and start switches to wire 282, wire 291, wire 292, switch 260, wire 293, wire 294, wire 303, switch 237, wire 304, wire 279, and wire 278. The drive bar now moves downward again past the cam rises in the cam-levers (thus forcing the wipers outwardly) and block 242 enters the box to wipe the covering material down inside the box. As it reaches this point, the follower of switch 236 again drops into its cam notch, but this time switch 236 is ineffective to retract the drive-bar, because relay switch arm 286 has moved away from relay terminal 287, thus breaking the power circuit to solenoid 220. Therefore the ram 20 continues to move down, overcoming the force of the cylinder 8, and moving downward the covered box and the door 158. Door 158 moves downward sufficiently so that leg 259 of bracket 257 releases the plunger of switch 260 and the contacts of this switch open. Immediately thereafter, a leg 259 closes switch 261. The opening of switch 260 opens the hold-in circuit of the relay, and the latter drops back to its deenergized position to establish the original circuit through switch 236 to the retract solenoid 220. The drive bar now starts to move up again. The closing of switch 261 supplies current to retract solenoid 222 of valve 29 through wire 305, wire 306, switch 261, wire 307, wire 291, wire 282, and through the start and stop switches to the transformer 265. Cylinder 8 now retracts to swing open door 158 on its pivot 159 to allow the covered box to drop into chute 187. As the drive bar 17 moves up, it pulls the wipers in again, and when it gets to the top of its stroke (or to its neutral position) it stops. The machine is now ready for another loading and another cycle with the door open, the drive bar up, the wipers in, and the relay deenergized.

If at any part of the cycle it is desired to return the drive bar to its uppermost or neutral position and to open the door, all that is necessary is to push the stop switch 266. Upon so doing, the contact arm 270 will pass current to both terminals 271 and 272 through the interior connection 269. From terminal 271 current flows to the retract solenoid 220 of valve 27 by means of wires 308 and 290. From terminal 272, current flows to the retract solenoid 222 of valve 29 by means of wires 309 and 305. Both cylinders then move their respective controlled elements to the neutral position.

An advantage of the box machine may now be emphasized. The box is placed on a heated block 242 and thus the box is being heated during the time that the ram is moving down on its first stroke. This puts to good use a time interval which on most machines is wasted. Also, the box is loaded above the table, the ejection is below the table and is automatic. This saves the operator's time, and also leaves a clear space for loading. A novel feature is the use of linear motion of the door to actuate certain switches, followed by a pivoting or swinging motion to eject the box in a direction away from the operator.

I have specified permanent magnets as the means for holding the box to the block 242. Most boxes used in the jewelry industry are made of sheet steel, and hence magnets will work. Electromagnets can be used, if desired. In the case of boxes made of non-magnetic material, a spring clip arrangement can be substituted for the permanent magnets without any difficulty.

I have shown the circuits of the pad and box machines as separate circuits for the purpose of clarity. If desired, these circuits can both be incorporated on the machine and a transfer switch with the proper number of poles used to transfer from one circuit to the other. In such a case, switch 41 may be left on top bar 6 but be disconnected when the machine is used for boxes. Similarly the three switches 236, 237 and 238 may be left on the top bar 6 when the machine is used for pads, with switches 236 and 237 being disconnected, and switch 238 being connected by the transfer switch to take the place of switch 40. Such a combining of the two circuits is within the knowledge of a person skilled in the art once the two circuits described here are made known to him, hence a detailed description combining the two circuits is not herein given.

In view of the above, it will be seen that the several objects of the invention are achieved and other advantageous results attained.

As many changes could be made in the above constructions without departing from the scope of the invention, it is intended that all matter contained in the above description or shown in the accompanying drawings, shall be interpreted as illustrative and not in a limiting sense.

I claim:

1. A machine for covering a form with covering material comprising: a stand; a table supported by the stand and having a discharge hole therein; a first reciprocating means supported by the stand on one side of said table; a second reciprocating means supported by the stand on the other side of said table; a door movably mounted with respect to said table, said door being actuated by said second reciprocating means and in one position forming a bottom for said hole; form-holding means mounted on said door; a plurality of third reciprocating means mounted on the table each of which is slidable toward and away from said form-holding means and automatically toward and away from each other; adjustable guide means mounted on said table for guiding said third reciprocating means; drive means controlled by said first reciprocating means; adjustable cam means connecting said drive means and said third reciprocating means for causing said latter means to move in predetermined relation to said drive means; and timing means for sequentially timing the predetermined motions of said first and second reciprocating means and thus said drive means, said cam means, said third reciprocating means, and said door, said timing means being operatively connected to said first reciprocating means and controlled thereby.

2. The machine of claim 1, in which said adjustable cam means is adapted to be connected to said drive means in two positions, in one of which the said third reciprocating means move toward the form holding means as said first reciprocating means moves toward said table, and in the other of which the said third reciprocating means move away from said form holding means as said first reciprocating means moves toward said table.

3. A machine for covering a form with covering material comprising: a stand; a table supported by the stand and having a discharge hole therein; form-holding means positioned above said hole; a first reciprocating means supported by the stand on one side of said form-holding means; a second reciprocating means supported by the stand on the other side of said form-holding means; a door movably mounted by a pivoted connection on said table between said second reciprocating means and said form-holding means, said door being actuated by said second reciprocating means and in one position forming a bottom for said hole; a plurality of wipers movably mounted on said table and slidable toward and away from said form holding means; adjustable guide means mounted on said table for directing the motion of said wipers; first drive means slidably mounted on said table and operatively connected to said wipers; second drive means operated by said first reciprocating means; adjustable and reversible cam means connecting said first drive means and said second drive means; and timing means for sequentially timing the predetermined motions of said first and second reciprocating means and thus said first and second drive means, said cam means, said wipers, and said door.

4. The machine of claim 3, in which said pivoted connection is elongated in a direction parallel to the motion of said first reciprocating means, thereby permitting said door to move linearly in a direction parallel to the motion of said first reciprocating means while the plane of said door remains at right angles thereto during a portion of its motion, said door being tiltable in respect to the motion of said first reciprocating means during the rest of the door's motion.

5. The machine of claim 3 in which said wipers comprise plates each having a base portion and a tongue portion, and each of said plates being provided with a groove on its under side adapted to receive slidably the tongue portion of the adjacent plate.

6. A machine for covering a form with covering material, comprising a stand; a table supported by the stand and having a discharge hole therein; form holding means positioned above said hole; a first fluid-actuated reciprocating means supported by the stand on one side of said table; a second fluid-actuated reciprocating means supported by the stand on the opposite side of said table; a movable door pivotally hinged to said table and adapted to act as a bottom for said hole, said door being actuated by said second fluid-actuated means; a plurality of wipers slidably mounted on said table and adapted for reciprocating movement toward and away from said form-holding means in a plane substantially at right angles to the motion of said first reciprocating means; drive means supported by and driven by said first fluid-actuated means; reversible and adjustable cam means connecting said wipers to said drive means for positioning said wipers in respect to said form holding means in accordance with predetermined positions of said drive means; and timing means mounted on said stand for operatively timing the motions of said first fluid actuated means in respect to the motions of said second fluid-actuated means.

7. A machine for covering a form with covering material comprising: a base; a table supported by the base and having a discharge hole therein approximately in the center thereof; a support bar mounted on the base above the table; a first air cylinder mounted on said bar; first drive means adjustably connected to the piston of said first air cylinder for reciprocating movement thereby; reversible cam means pivoted to said bar and operatively linked to said first drive means; slidable means sliding lengthwise on said table and adjustably connected to said cam means; adjustable guide means mounted on said table in predetermined relation to said slidable means; a plurality of wipers slidably mounted on said table and operatively connected to said slidable means and said guide means to be moved toward and away from said hole by the combined action of said slidable means and said guide means; a movable door hinged to said table and forming in one position a bottom for said hole; a second air cylinder mounted on said base and having its piston connected to said door to move the latter; and timing means mounted on said base for sequentially timing the movements of the piston of said first air cylinder with respect to the movements of the piston of said second air cylinder.

8. A machine for covering forms with a covering material comprising a stand; a table supported on the stand and having a central discharge hole therein; a support bar mounted on the stand above the table; a first reciprocating means mounted on the support bar; a lengthwise extending drive bar adjustably connected to said first reciprocating means and movable toward and away from the table; at least one cam means supported by said support bar and adapted to be moved inwardly by said drive bar when the latter has moved a predetermined distance toward said table; slidable means on said table adjustably and pivotally connected to said cam means so as to be moved by the latter toward said hole as the drive bar moves toward the table; a plurality of wipers slidably supported on the table and having slidable intermeshing tongue portions surrounding said hole; at least one guide means adjustably mounted on said table and coacting with said sliding means to move said wipers toward each other and said hole as said drive bar moves toward said table; a door hinged to said table and adapted to close the bottom of said hole; a second reciprocating means mounted on said stand and connected to said door for moving the latter; and timing means operated by said drive bar for timing the first and the second reciprocating means in predetermined sequential relation.

9. A machine for covering a form with covering material comprising: a base; a table horizontally supported on the base and having a discharge hole therein; form holding means positioned above said hole; a support bar mounted on the base above said table; a first air cylinder mounted on the support bar with its piston projecting downwardly through the support bar toward the table; a ram carried by said piston; a horizontal lengthwise extending drive bar adjustably mounted on said ram; reversible cam-levers pivotally hung by one end thereof from each end of said support bar, each cam-lever being provided with a cam slot extending lengthwise thereof and adapted to receive a cam follower mounted at each end of said drive-bar; a pair of T-bars, each slidably mounted on said table at each end thereof, each T-bar being adjustably and pivotally connected to the bottom of the respective cam-lever, and being provided with slots therein extending in a direction at right angles to the motion of the T-bar; a pair of adjustable cam plates, each overlying a T-bar and being provided with inwardly inclined slots which overlap the said slots of the T-bars at an angle thereto; a plurality of wipers slidably mounted on the table, each of which has a tongue portion which slides in a groove provided in the adjacent wiper, said wipers intermeshing and being adapted to move toward and away from said form-holding means while surrounding said means; a projecting stud for each wiper engaging a T-bar slot and a cam-plate slot; a door pivotally hung from the underside of the table and adapted to be moved upwardly to constitute a bottom for said discharge hole; a second air cylinder mounted on the base below said table with its piston pivotally connected to said door; at least one timing bar mounted on said drive bar, and slidably extending upwardly through said support bar; and at least one timing switch mounted on said support bar and positioned to be actuated by said timing bar for controlling the predetermined sequential motion of first and second air cylinders, thereby to actuate in a predetermined sequence said cam-bars, T-bars, wipers, ram, and door.

10. A machine for covering a pad with covering material comprising: a base; a table supported by said base and having a discharge hole therein; a first reciprocating means supported by said base on one side of said table; a second reciprocating means supported by said base on the other side of said table; a door movably mounted with respect to said table and adapted to be actuated by said second reciprocating means to a position to form a bottom for said hole; a plurality of wipers slidably mounted on said table and adapted for reciprocating motion toward and away from said form-holding means in a plane substantially at right angles to the motion of said first reciprocating means; drive means supported by and driven by said first fluid actuated means; adjustable cam means connecting said wipers to said drive means; adjustable guide means mounted on said table and acting, in conjunction with said adjustable cam means to move said wipers toward and away from said hole; a sub-table mounted on said door and projecting above said table for holding said pad; spacing means resiliently mounted on said door and projecting above said table and said sub-table for supporting said wipers; and timing means mounted on said base for operatively timing the motions of said first reciprocating means in respect to the motions of said second reciprocating means.

11. The machine of claim 10 in which said spacing means comprises a frame surrounding but not attached to said sub-table, said frame having an upstanding lip for supporting said wipers and downwardly extending legs or bosses adapted to support resiliently the frame on said door; and said frame having adjusting means coacting with said door whereby the height of said upstanding lip above said table may be varied.

12. The machine of claim 10 in which said timing means comprise electrical switches mounted on said base; timing rods actuated by said first reciprocating means and in turn actuating said electrical switches; and valve means on said first and second reciprocating means operated electrically by said electrical switches.

13. A machine for covering a box with covering means, comprising a base, a table having a discharge hole therein; a die plate mounted on said table above said hole and adapted to receive the box in the die-opening thereof; a first fluid-actuated reciprocating means supported on the base on one side of said die-plate; a second fluid-actuated reciprocating means supported on the base on the other side of said die-plate; a door movably mounted with respect to said table and carrying thereon a pressure pad, said door being operated by said second reciprocating means; wipers slidably mounted on the table for motion to and away from said die-opening; at least one cam means pivotally connected to said base and operatively connected to said wipers for moving said wipers; means linking said first reciprocating means and said cam means for positioning said cam means, and thus said wipers, in accordance with predetermined positions of said first reciprocating means; electrical trip switches mounted on said base for actuating both of said reciprocating means; box carrying means attached to said first reciprocating means; and timing means operatively connecting said first reciprocating means with said trip switches, whereby the motions of said second reciprocating means are determined by motions of said first reciprocating means.

14. A machine for covering a box with covering material, comprising a base, a table supported by said base and having a discharge hole therein; a die plate having a die-opening therein mounted on said table above said discharge hole and adapted to receive the box in said opening; a first fluid actuated reciprocating means mounted on the base on one side of said die plate; a second fluid-actuated means mounted on the base on the opposite side of said die plate; a movable door hinged by a pivoted connection to said table and adapted to act as a bottom for the hole in said table, said door carrying a pressure pad thereon, and said door being actuated by said second fluid-actuated means; a plurality of wipers slidably mounted on said table and adapted for reciprocating movement toward and away from said die-opening in a plane substantially at right angles to the axis thereof; first adjustable cam means operatively connecting said wipers to said first fluid-actuated means for positioning said wipers in respect to said die-opening in accordance with predetermined positions of said first fluid-actuated means; box holding means mounted on said first fluid-actuated reciprocating means for detachably holding a box thereon as said first fluid-actuated means moves toward said table; adjustable guide means for guiding said wipers in their motions; and means mounted on said base for operatively timing the motions of said first fluid-actuated means in respect to the motions of said second fluid-actuated means, whereby for a part of the cycles of motion of said fluid actuated means said means move toward each other, at another part of the cycle of motions, said means move in the same direction but with their forces opposed, and in a third part of said cycle, the fluid-actuated means move in opposite directions.

15. The machine of claim 14 in which said timing means comprise electrical switches operated by said first fluid-actuated means; electrical switches operated by said door; and a relay; said switches and said relay connecting a power source to electrically operated valves for controlling said first and second fluid-actuated means; one of said switches operated by the door controlling an electrical lock-in circuit to the coil of said relay.

16. The machine of claim 14 in which said box holding means comprises a metal block having mounted therein electrical heaters for heating said block.

17. The machine of claim 14 in which said box holding means comprises a metal block having magnets mounted thereon for detachably holding a sheet steel box onto said block.

18. The machine of claim 14 in which said pivoted connection comprises a pair of aligned elongated holes supporting a bearing rod on which said door swings, the elongation of said holes extending in a direction parallel to the motion of said box holding means, whereby said door is enabled also to move in a direction parallel to the motion of said box holding means.

19. A reversible corner plate for use in a wiper assembly, comprising an elongated metal block having one end obliquely slanted, and a thin fin projecting from the other end of said block as a continuation of the edge of the block, the obliquely slanted end of said block being rounded from top to bottom, and the other end of said block back of said fin also being rounded from top to bottom.

References Cited in the file of this patent

UNITED STATES PATENTS

| | | |
|---|---|---|
| 1,056,004 | Butler et al. | Mar. 18, 1913 |
| 1,088,899 | Harris | Mar. 3, 1914 |
| 1,144,022 | Berger | June 22, 1915 |
| 1,200,273 | Taylor | Oct. 3, 1916 |
| 1,620,725 | Heyer et al. | Mar. 15, 1927 |
| 1,879,212 | Hainlen | Sept. 27, 1932 |
| 1,939,085 | Scott | Dec. 12, 1933 |

FOREIGN PATENTS

| | | |
|---|---|---|
| 215,325 | Germany | Oct. 23, 1909 |